United States Patent
Mahar et al.

(10) Patent No.: US 11,425,238 B2
(45) Date of Patent: Aug. 23, 2022

(54) SYSTEM AND METHOD FOR LIMITING MOBILE DEVICE FUNCTIONALITY IN A GEOGRAPHIC AREA

(71) Applicant: Cbros Technologies, LLC, Winter Park, FL (US)

(72) Inventors: Stephen Nelson Mahar, Eliot, ME (US); Donald Edward Williams, Jr., Winter Park, FL (US)

(73) Assignee: Cbros Technologies, LLC, Winter Park, FL (US)

( * ) Notice: Subject to any disclaimer, the term of this patent is extended or adjusted under 35 U.S.C. 154(b) by 0 days.

(21) Appl. No.: 17/232,126

(22) Filed: Apr. 15, 2021

(65) Prior Publication Data

US 2021/0234955 A1 Jul. 29, 2021

Related U.S. Application Data

(63) Continuation-in-part of application No. PCT/US2019/056164, filed on Oct. 14, 2019, which is a continuation-in-part of application No. 16/160,175, filed on Oct. 15, 2018, now Pat. No. 10,931,816, which is a continuation-in-part of application No. 14/947,385, filed on Nov. 20, 2015, now Pat. No. 10,104,224, which is a continuation-in-part of application No. 14/212,740, filed on Mar. 14, 2014, now abandoned, application No. 17/232,126, which is a continuation-in-part of application No. 17/183,307, filed on Feb. 23, 2021, which is a continuation of application No. 16/160,175, filed on Oct. 15, 2018, now Pat. No.

(Continued)

(51) Int. Cl.
*H04M 1/72463* (2021.01)
*H04W 4/021* (2018.01)

(52) U.S. Cl.
CPC ....... *H04M 1/72463* (2021.01); *H04W 4/021* (2013.01)

(58) Field of Classification Search
CPC .......................... H04M 1/72463; H04W 4/021
See application file for complete search history.

(56) References Cited

U.S. PATENT DOCUMENTS

2013/0072174 A1\* 3/2013 Enty ................. H04M 1/72463
455/418
2013/0244684 A1\* 9/2013 Kadous ................ H04W 4/029
455/418

\* cited by examiner

*Primary Examiner* — Natasha W Cosme
(74) *Attorney, Agent, or Firm* — Lowndes; Stephen C. Thomas

(57) ABSTRACT

A method and system for limiting mobile device functionality when the mobile device is located in a pre-defined fixed geographic area. The mobile device may receive a local disabling signal from a disabling device, which, when detected by a Device Owner Application resident on the mobile device, limits the mobile device functionality. Alternatively, the system may use GPS based geofencing to determine that the mobile device is in a predefined geographic area, and then transmit instructions to the mobile device, where a Device Owner Application operates to restrict the mobile device functionality. Mobile device functionality may be limited by restricting the mobile device's ability to send and receive text messages, email messages and phone calls; restricting the mobile device's ability to respond to user input; restricting the mobile device's ability to utilize a web browser; and restricting the mobile device's web browser from accessing predetermined web sites.

30 Claims, 16 Drawing Sheets

Related U.S. Application Data

10,931,816, which is a continuation-in-part of application No. 14/947,385, filed on Nov. 20, 2015, now Pat. No. 10,104,224, which is a continuation-in-part of application No. 14/212,740, filed on Mar. 14, 2014, now abandoned.

(60) Provisional application No. 61/801,025, filed on Mar. 15, 2013.

| Hierarchy Level | 1 | 2 | 3 | 4 |
|---|---|---|---|---|
| | STATE | COUNTY B | SCHOOL F | CLASSROOM 24 |
| | | | | CLASSROOM 23 |
| | | | | CLASSROOM 22 |
| | | | | CLASSROOM 21 |
| | | | SCHOOL E | CLASSROOM 20 |
| | | | | CLASSROOM 19 |
| | | | | CLASSROOM 18 |
| | | | | CLASSROOM 17 |
| | | | SCHOOL D | CLASSROOM 16 |
| | | | | CLASSROOM 15 |
| | | | | CLASSROOM 14 |
| | | | | CLASSROOM 13 |
| | | COUNTY A | SCHOOL C | CLASSROOM 12 |
| | | | | CLASSROOM 11 |
| | | | | CLASSROOM 10 |
| | | | | CLASSROOM 9 |
| | | | SCHOOL B | CLASSROOM 8 |
| | | | | CLASSROOM 7 |
| | | | | CLASSROOM 6 |
| | | | | CLASSROOM 5 |
| | | | SCHOOL A | CLASSROOM 4 |
| | | | | CLASSROOM 3 |
| | | | | CLASSROOM 2 |
| | | | | CLASSROOM 1 |

*Fig. 12*

SYSTEM AND METHOD FOR LIMITING MOBILE DEVICE FUNCTIONALITY IN A GEOGRAPHIC AREA

CROSS-REFERENCE TO RELATED APPLICATION

This non-provisional application is a continuation-in-part application (CIP) of and claims benefit of priority to International Application PCT/US19/56164 entitled "SYSTEM AND METHOD FOR LIMITING MOBILE DEVICE FUNCTIONALITY IN A GEOGRAPHIC AREA", filed in the United States Receiving Office (USRO) on Oct. 14, 2019, which published as WO 2020/081474 A1 on Apr. 23, 2020, the disclosure of which is incorporated herein by reference in its entirety; this application is also a continuation in part (CIP) of U.S. patent application Ser. No. 17/183,307 entitled SYSTEM AND METHOD FOR LIMITING MOBILE DEVICE FUNCTIONALITY IN A GEOGRAPHIC AREA, filed in the United States Patent and Trademark Office (USPTO) on Feb. 23, 2021, which was published by the USPTO as U.S. Patent Publication No. US 2021-0185165 A1 on Jun. 17, 2021, the disclosure of which is incorporated herein by reference in its entirety: both PCT/US19/56164 and Ser. No. 17/183,307 are a continuation-in-part applications of U.S. patent application Ser. No. 16/160,175, filed in the United States Patent and Trademark Office (USPTO) on Oct. 15, 2018 titled "SYSTEM AND METHOD FOR LIMITING MOBILE DEVICE FUNCTIONALITY IN A GEOGRAPHIC AREA", which was published by the USPTO as U.S. Patent Publication No. US 2020-0084314 A1 on Mar. 12, 2020 and which issued from the USPTO as U.S. Pat. No. 10,931,816 on Feb. 23, 2021, the disclosure of which is incorporated herein by reference in its entirety; which was a continuation-in-part application (CIP) of U.S. patent application Ser. No. 14/947,385 filed in the United States Patent and Trademark Office (USPTO) on Nov. 20, 2015 titled "Limiting Mobile Device Functionality in a Vehicle" which was published by the USPTO as U.S. Patent Publication No. US 2017-0078474 A1 on Mar. 16, 2017, and which issued from the USPTO as U.S. Pat. No. 10,104,224 on Oct. 16, 2018, the disclosure of which is incorporated herein by reference in its entirety; which is a continuation-in-part application (CIP) of U.S. patent application Ser. No. 14/212,740, filed in the USPTO on Mar. 14, 2014, entitled "Limiting Mobile Device Functionality in a Vehicle", which was published by the USPTO as U.S. Patent Publication No. U.S. 2014-0274026 A1 on Sep. 18, 2014, the disclosure of which is incorporated herein by reference in its entirety and which is a non-provisional of and claims priority to U.S. Provisional Patent Application No. 61/801,025, filed in the USPTO on Mar. 15, 2013, entitled "Method and System for Limiting Mobile Device Functionality in a Vehicle", which is also incorporated herein by reference in its entirety.

FIELD OF THE INVENTION

The present disclosure generally relates to limiting the functionality of mobile devices or computers when such devices are located within predetermined geographic areas. Such areas may be, for example, work areas designated by employers such as retail store sales floors, warehouses, factory and manufacturing facilities, and offices; areas related to vehicular traffic such as crosswalks and intersections; areas in which danger may be present requiring that a mobile device or computer user stay alert and not be distracted by the use of a mobile device such as subway or train platforms; areas in which specified activities are expected to occur requiring a mobile device or computers user to pay attention such that they do not lose situational awareness, and are not distracted by the use of a mobile device or computers such as, for example and not by way of limitation, school classrooms, surgical operating theaters, areas of congested vehicle traffic or lecture halls; and any other geographic area in which it is desired that person's situational awareness not be diminished or subject to distraction by use of, or interaction with, a mobile device or computer. These examples of predetermined areas are exemplary only, and are not intended to be non-limiting.

BACKGROUND

The personal, societal, and economic impacts of the distracting nature of mobile device use are well chronicled. For example, studies show that texting while driving increases the risk of an accident by 2300%. Texting while driving resulted in 16,141 deaths in the U.S. between 2001 and 2007, and in 2009, 5,474 people were killed in the U.S. because of accidents that involved distracted driving. Another 448,000 were injured.

Younger generations have grown up using texting, social media posting, internet browsing, emailing, browsing and watching multi-media on electronic devices, including mobile devices, from a very young age. Most teenagers send hundreds, if not thousands, of texts each week, making it their primary form of communication. It is an engrained habit. Stepping away from it voluntarily, even when presented with the dangers to themselves and others they may impact, is very difficult. The increasing amount of accidents, cost, injuries, and deaths is alarming. The tripling of suicide and self-harm statistics in pre-teens since 2011, statistics that previously had remained steady for decades, has been attributed to excessive use of mobile devices and social media.

Furthermore it is understood that certain environments such as schools, hospitals, and other work areas are experiencing a continuously increasing proliferation of mobile devices and computers that is causing a significant loss of focus and situational awareness on the part of the users of such devices.

Current systems have attempted to address this issue but have major drawbacks. Such drawbacks include reliance on multiple voluntary actions by the driver and/or reliance on the motion of the vehicle (i.e. a certain minimum speed). There are many documented crashes involving a driver texting while driving at a slow speed, such as rolling slowly through a stop or red light into an intersection. Some systems rely on wireless transmissions, such as conventional Bluetooth®, that require synchronization with each vehicle. Some systems also gather driver performance data, such as speed or number of hard stops. Such systems may be considered intrusive on the driver's privacy. Many systems can be readily defeated by a driver determined to do so. In addition, some systems' components can be disabled without accountability to a monitoring entity.

As such, there is a need in the art for a system and method that can automatically limit mobile device or computer functionality, including the ability to text, place calls, interact with user input or output devices, and to restrict web site access when a mobile device mobile devices and computer is within a geographic area that, preferably but not necessarily, has been predefined.

SUMMARY

In accordance with the teachings disclosed herein, embodiments related to a method, device, and system for limiting mobile device or computer functionality in a predetermined geographic area are disclosed and claimed. Also disclosed is a system and method in which a vehicle has a disabling device associated therewith and the disabling device comprises a motion detector.

In an embodiment of a vehicle-based system of the invention, the system comprises a disabling device and a mobile device. The disabling device has a motion detector, a microcontroller, and a signal generator. The microcontroller, which is in communication with the motion detector, receives a motion status of the vehicle from the motion detector. The signal generator, which is in communication with the microcontroller, transmits a disabling signal when it receives the motion status of the vehicle indicating that the vehicle is in motion. The mobile device, which has a Device Owner Application software application residing thereon, receives the disabling signal. The software application alters the mobile device's system configuration responsive to the received disabling signal.

In an additional embodiment of a vehicle-based system of the invention, the disabling device comprises a motion detector, microcontroller and a signal generator. The microcontroller, which is in communication with the motion detector, receives a motion status of the vehicle from the motion detector. The signal generator, which is in communication with the microcontroller, transmits a disabling signal when it receives the motion status of the vehicle indicating that the vehicle is in motion.

In another embodiment of a vehicle-based system of the invention, a method comprises detecting, at the motion detector, a motion status of the vehicle. A disabling signal is transmitted to a mobile device in communication with the disabling device. The disabling signal is transmitted as long as the motion status of the vehicle indicates the vehicle is in motion. The determination of the motion status may repeat continuously or periodically. The disabling signal triggers a software application on the mobile device to limit the functionality of the mobile device.

In an embodiment of a geographic-based system of the invention, the invention comprises a system and method for limiting mobile device functionality in a geographic area in which it is desired to limit or control the use of a mobile device or computer, comprising at least one disabling device having a signal generator in which the signal generator transmits a disabling signal that is effective to be received by a user's mobile device or computer in the geographic area, and a mobile device or computer comprising a receiver for receiving the disabling signal, in which a Device Owner Application on the mobile device or computer alters the mobile device's, or the computer's, system configuration responsive to receipt of, or content of, the disabling signal. The Device Owner Application residing on the mobile device or computer may perform any combination of the following functions when the mobile device or computer is located within the geographic area by altering the mobile device's system configuration: 1) restrict the mobile device's or computer's ability to send and receive text messages, email messages, or both; 2) restrict the mobile device's or computer's ability to respond to user input; 3) restrict the mobile device's or computer's ability to place and receive phone calls; 4) restrict the mobile device's or computer's ability to place and receive phone calls requiring user interaction with a touch screen or a keyboard of the mobile device or computer; 5) restrict the mobile device's ability to utilize a web browser application on the mobile device to access certain pre-determined web sites, to allow access to only certain pre-determined web sites and/or social media, or the deny access to all web sites and/or social media as specified by a system administer (e.g. parent and/or teacher) at times and locations (e.g. at school) specified by the system administrator; and 6) via a web portal data display and data input from and to a set of executable instructions running on a processor that is in communication with the mobile device or computer, allow an authorized system administrator to readily and remotely determine authorized web sites and to communicate such selection of determined authorized web sites to the Device Owner Application residing on the mobile device or computer, such that the mobile device or computer is allowed to access only such authorized web sites and is not allowed to access other, non-authorized web sites, and to establish time periods and dates such selected authorized web sites may be accessed by the mobile device or computer. The web portal may allow the system administrator to enter data establishing varying levels of web site access, and to determine the manner and extent to which the Device Owner Application alters the system configuration of a mobile device or computer when it has received a valid disabling signal, based on the mobile device or computer user's job function or based on any user groups to which the mobile device, computer or user may belong. In the example in which the invention is used by an employer to restrict employee access to mobile devices, it may be desired for the system administrator, via the web portal, to allow employees access to work scheduling, company inventory, or company policy websites, where the extent of access may vary depending upon that employee's job function or user group. User groups may identify groups of mobile device users or computer users for whom it is desired to grant similar authorization for web site use or other mobile device or computer function authorizations or restrictions. For example, and not by way of limitation, a system administrator may allow a manager to have greater or different website access than a supervisor; or the system administrator may allow a user group comprised of a plurality of physicians at a hospital greater website access than a group of nutritionists, and so on. In a non-limiting example of use of the invention in a school or teaching environment, it may be advantageous for a school system administrator via the web portal to allow students access to certain websites for usage in a classroom for educational purposes. This access may be readily and remotely established for essentially any desired website or websites to be authorized, for any time period, and for any desired dates. For example, a $12^{th}$ grade class of advanced math students may be allowed greater access to authorized educational websites than a $9^{th}$ grade class of beginning math students. In a non-limiting home use example, the system administrator (for example, parents) may allow greater authorized website access for longer time periods to older children than to younger children. For example older children may have certain authorized web site access for hours other than 10:00 pm to 6:00 am, while the younger children may have certain authorized web site access for hours other than 08:30 pm to 7:00 am in order to facilitate uninterrupted sleeping. Additionally for safety purposes, in any instance, the system administrator may, via the web portal, immediately disengage the invention's controls on all of the mobile devices or computers within a restricted geographic area so as to reinstitute full mobile device or computer functionality to allow full device communication capabilities by the mobile device or computer users. An example of the need for this feature would be the presence of a terrorist or active shooter in a school or work situation, where communication with all students or employees is an important safety aspect of mobile devices and computers.

The signal generator and mobile device or computer receiver may form a communication link that does not require an affirmative action by a mobile device or computer user to communicate. The geographic area is defined as any area in which it is desired to restrict the functionality of a mobile device mobile device or computer, for example a work area, a school area, a vehicle traffic area, and a train platform and in which the disabling signal is effective to be received by the mobile device or computer. The invention also includes a method of limiting mobile device functionality in a geographic area in which it is desired to limit or control the use of a mobile device or computer when the mobile device or computer is located within a geographic area comprising providing a disabling device having a signal generator capable of transmitting a disabling signal, the disabling signal being effective within a desired geographic area, and not being effective outside the desired geographic area; transmitting the disabling signal within the desired geographic area; receiving the disabling signal by a mobile device or computer that comprises a Device Owner Application, the mobile device receiving said disabling signal as long as the mobile device or computer is located within the desired geographic area; and limiting the functionality of the mobile device or computer by the Device Owner Application altering the system configuration of the mobile device or computer as long as the mobile device or computer is located within desired geographic area. The method may also include polling, at the mobile device or computer, for the disabling signal from the disabling device; receiving, at the mobile device or computer, the disabling signal; and altering the mobile device's or computer's system configuration responsive to the disabling signal being valid, said altering being carried out by said Device Owner Application. In an embodiment the method of the invention may further comprise receiving, at the mobile device or computer, a second disabling signal; determining if the second disabling signal is valid; and restoring the mobile device's or computer's system configuration responsive to the second disabling signal being invalid, said restoring carried out by said Device Owner Application running on the mobile device or computer. In non-limiting embodiments, the geographic area of the invention may further be defined as being selected from the group consisting of a work area, a school area, a vehicle traffic area, and a train platform; and the system configuration functionality to be altered by the Device Owner Application in response to receipt of the disabling signal may be defined as comprising, in any combination, the ability to place a phone call, the ability to send and receive text messages and email messages, the ability to respond to user input, the ability to display information on a display of the mobile device or computer and the ability to utilize a web browser to access web sites via the Internet, for example, preventing the mobile device or computer from accessing unauthorized web sites. In embodiments, the invention may comprise a method of limiting mobile device or computer functionality in a geographic area in which it is desired to limit or control the use of a mobile device or computer comprising: polling, at the mobile device or computer, for a disabling signal from a disabling device; receiving, at said mobile device or computer, a disabling signal from said disabling device; determining if the disabling signal is valid; altering, by a Device Owner Application on the mobile device or computer, the mobile device's or computer's system configuration responsive to the disabling signal being valid; polling for the disabling signal; and restoring the mobile device's or computer's system configuration responsive to lack of receipt of the disabling signal after a pre-determined amount of time. The disabling signal may comprise an identifier. The Device Owner Application may alter the mobile device's or computer's system configuration by restricting the mobile device's or computer's ability to send and receive text messages and emails; restricting the mobile device's or computer's ability to respond to user input; restricting the mobile device's or computer's ability to place and receive phone calls; restricting the mobile device's or computer's ability to place and receive phone calls that require user interaction with a touch screen or a keyboard of the mobile device or computer; restricting the mobile device's or computer's ability to utilize a web browser application on the mobile device or computer such that the mobile device or computer user is only allowed to access pre-determined authorized web sites, is prevented from accessing certain predetermined web sites, or is prohibited from accessing any web sites whatsoever.

The ability of the system administrator to remotely, and at any time, modify the way in which the invention alters the mobile device or computer's system configuration, and to select authorized web sites which a mobile device or computer is allowed to access, is a significant improvement on the state of the art in that it allows a system administrator to change system parameters in real time to react to real-world situations such as natural disasters, active shooters, local weather threats, severe infrastructure interruptions, and the like.

In a further embodiment, a method of the invention comprises polling, at a mobile device or computer, for a disabling signal. The disabling signal may originate at, and may be transmitted by, a disabling device. Once a disabling signal is received by the mobile device or computer and it is determined that the disabling signal is valid, the mobile device's or computer's system configuration may be altered by a Device Owner Application software application on the mobile device or computer. The mobile device or computer continues polling for the disabling signal. The mobile device's or computer's system configuration may be restored when the disabling signal is not received for a pre-determined amount of time.

In a further embodiment, the system and method of the invention may use a geolocation signal transmitter such as for example, Global Navigation Satellite System (GNSS) satellite-based geolocation information in the geofencing functions and steps described herein. GNSS includes but is not limited to Global Positioning System (GPS, U.S.), Globalnaya Navigazionnaya Sputnikovaya Sistema, or Global Navigation Satellite System (GLONASS, Russia), Galileo (Europe), Beidou/BDS (China), Indian Regional Navigation Satellite System (IRNSS)/Navigation Indian Constellation (NavIC) (India), Quasi-Zenith Satellite System (QZSS) and other regional satellite-based geolocation systems. As used here, both "GNSS" and "GPS" include within their meaning all the above and any equivalent system usable for determining the location of a user mobile or other electronic device having a GNSS or GPS receiver and software or firmware code that is executable by a processor of the mobile or electronic device operable to determine the mobile or electronic device position in three dimensional space, i.e. to "geolocate". For the system and method embodiments that utilize geolocation or geofencing functionality described herein, the user mobile or electronic device may be defined as comprising such a GNSS or GPS receiver, software or firmware code, and controller or processor in communication with one another, and operable to determine the geographic location of the mobile device. In embodiments, the system and method of the invention may comprise method steps of establishing a geographical boundary by, for example, a system administrator inputting geographical boundary information into a system administrator computer or web portal; determining the geolocation, i.e. geographic location, of a user's mobile device; determining whether the mobile device is within the established geographic boundary, and taking an action, such as transmitting a message containing system configuration information to the mobile device in order to alter the mobile device system configuration based when the device is inside the geographical boundary.

Any of the embodiments of the invention may comprise steps for defining time windows within which certain system configuration parameters apply; thus, for example, within a given geographic area, the mobile device system confirmation may be placed in one state in a given time window, and another state during another time window, allowing the system and method of the invention, for example, to allow limited mobile device functionality during school hours when a mobile is geographically located within a geographic boundary defining the school grounds, and allow for a greater degree of functionality after school hours when the mobile device is geographically located within the school boundary.

Any number of geographic areas or sub-areas may be defined by the system administrator(s), in an shape, and in any configuration and priority.

BRIEF DESCRIPTION OF THE DRAWINGS

FIG. 12 depicts an exemplary view of an embodiment of a hierarchy of the system and method of the invention directed to limiting mobile device functionality in a geographic area.

Figure 1:
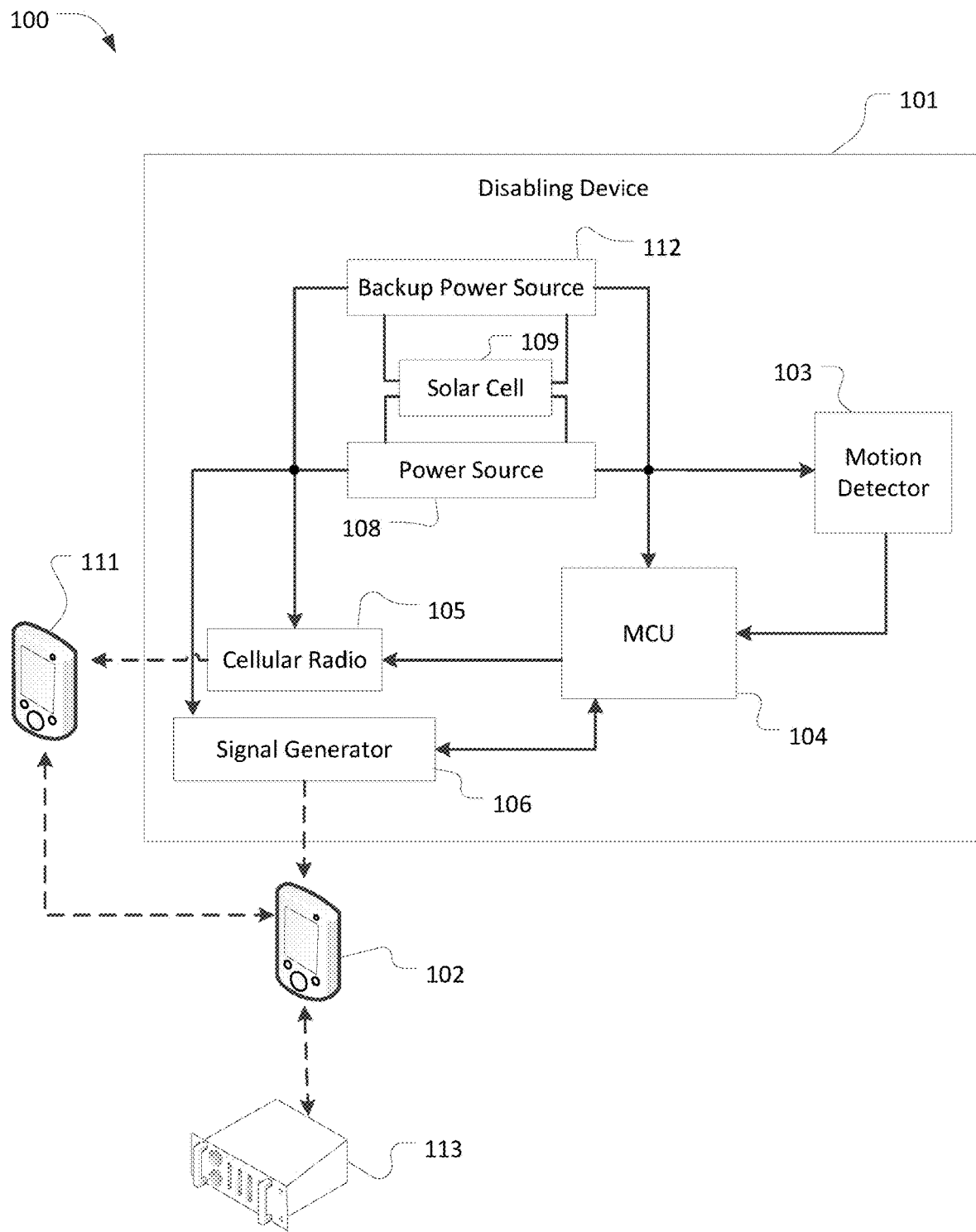
FIG. 1 is a block diagram of a system for limiting mobile device functionality according to an embodiment of the present invention.

In the figures of the drawings, like item callouts refer to like features.

DETAIL DESCRIPTION OF THE EMBODIMENTS

A detailed description of the embodiments for a system, device, and method for limiting mobile device or computer functionality in an operating vehicle or geographic area will now be presented with reference to FIGS. 1 through 16. One of skill in the art will recognize that these embodiments are not intended to be limitations on the scope, and that modifications are possible without departing from the spirit thereof. In certain instances, well-known methods, procedures, components, and circuits have not been described in detail.

As used herein, "Device Owner Application" includes within its meaning a specific type of application running on a mobile device that 1) must be loaded onto a mobile device or computer at the time of manufacture of the mobile device or computer, or is loaded onto a mobile device or computer only after a hardware reset of the mobile device or computer; and 2) cannot be disabled, rendered inoperable or turned off by a user of the mobile device or computer unless a hardware reset of the device is performed. This is in contrast to non-Device Owner applications that have been downloaded and installed on a mobile device or computer from a web site such as an online application store ("downloaded applications"), or application or software that is loaded onto a mobile device or computer by other means such as through an electrical serial data connection to a separate storage media, computer or other external device. Such non-Device Owner applications may be deleted, disabled, rendered operable or turned off by a user of the mobile device or computer without the need for performing a hardware reset of the mobile device or computer and are not within the definition of "Device Owner Application" A Device Owner Application is an application that cannot be defeated, disabled or uninstalled by a user of the mobile device or computer without a hardware reset of the mobile device. A Device Owner Application is structurally different from a downloaded application in that it runs as a Device Administrator on the mobile device or computer, and as such may take control of mobile device or computer system configuration and security functions, and may alter the system configuration of the mobile device or computer. Downloaded non-Device Owner applications are not able to take control of system configuration and security functions, and are thus not able to alter the system configuration of a mobile device.

As used herein, "application" or "software" includes within its meaning a set of non-transitory computer executable instructions that may be executed by a processor or controller forming, for example, a part of an MCU, mobile device or computer, or by a plurality of processors or controllers forming a part of an MCU, mobile device or computer. The non-transitory computer executable instructions may reside in a physical computer readable or controller readable storage media that is in communication with a processor or controller of an MCU, mobile device or computer.

As used herein, "mobile device" and "mobile device or computer" means any electronic device for which control is desired. Included within the meaning of "mobile device" and "mobile device or computer" is any device that may be 1) capable of receiving a wireless disabling signal transmitted from a disabling device of the invention; and 2) capable of using the receipt of the disabling signal to alter the mobile device's system configuration. Mobile devices or computers may also have transceivers in communication with processors or controllers providing the capability of receiving instructions from a system administrator via a communication link, where the instructions provide specific instructions for the alteration of the mobile device's system configuration as described herein; and also providing the capability to transmit information such as, for example and not by way of limitation, current mobile device geographic location information, to third party receivers such as system administrator computers. The mobile device may have one or more transceivers operable to communicate with third party receivers such as system administrator computers via any communication means known such as radio frequency (RF), optical, wired through serial or parallel data ports or other known methods for communication through any data communication networks such as cellular data networks, local area networks, wide area networks, and point-to-point communication. Thus mobile devices may receive system configuration instructions from a system administrator computer. Mobile devices may also comprise a receiver for receiving a geolocation signal or signals from at least one or a plurality of geolocation transmitters, which may be but are not necessarily satellite based, such as a GPS or GNSS. Mobile devices may comprise non-transitory computer readable and executable instructions stored on a physical storage medium that is in communication the processors, controllers, circuits and firmware of the mobile device. The functions of the mobile device described herein may be carried out by the processors, controllers, circuits and firmware of the mobile device operating on such stored non-transitory computer readable and executable instructions, and controlling the components of the mobile device according to such instructions. Non-limiting examples of mobile devices or computers include mobile (cell) phones, radios, electronic tablets, personal digital assistants, computers of any kind including but not limited to laptop and desktop computers, electronic devices that have the capability to communicate via the world wide web or Internet to access web sites, and electronic devices that have the capability to communicate wirelessly or in wired fashion with any server or network, for any purpose or function. Such wireless communication may be radio frequency or optical communication, meaning that the mobile device or computer may comprise radio frequency or optical receivers in communication with the controller or processor of the mobile device or computer. Mobile devices or computers may comprise controllers or processors capable of executing controller readable instructions, the controllers or processors being in communication with physical computer readable storage media for storing such controller readable instructions; and the controller or processor may also be in communication with at least one receiver for receiving the disabling signal and, optionally, the controller or processor may be in communication with a receiver for receiving information from a system administrator containing system configuration control information from the system administrator that defines the system configuration control to be exercised by the Device Owner Application when a disabling signal is received by a receiver of the mobile device or computer. The controller or processor of the mobile device or computer may also be in communication with a visual display or touch screen as well as a user input device such as a physical keypad or soft keypad that is displayed on a touch screen for displaying information to a user and for receiving input from a user.

As used herein, "system configuration" includes within its meaning the response of a mobile device or computer to a set of system configuration parameters communicated to or stored within a mobile device or computer, that control the mobile device's or computer's ability to place or receive phone calls, send or display text messages, accept mobile device or computer user input via a keyboard, touchscreen or other user input device connected to a controller or processor of the mobile device or computer, display information on a video display or screen, or access specified web sites using a web browser application or other application residing on the mobile device or computer.

As used herein, "system configuration control" includes within its meaning controlling of the stored system configuration parameters to achieve a desired system configuration, such as altering a system configuration of a mobile device or computer.

As used herein, "restrict" includes within its meaning the limiting of a mobile device function or application such that the function is either fully disabled, or access to such function or application is denied, or is not fully available to the user of the mobile device in some way. In other words, as an example, to restrict the ability to send or receive text messages includes within its meaning disabling all text messaging; only allowing text messages to be sent to specific receiving parties; only allowing text messages to be received from specific transmitting parties; only allowing the transmission or receipt of a maximum number of text messages within a given period of time; or other limitations on the ability to send or receive text messages as may be determined by a system administrator. Such restrictions, as determined by a system administrator and entered into a system administrator computer and associated with a specific fixed geographic area or sub-area, form a part of the system configuration instructions transmitted to a mobile device when the mobile device is located in the specific fixed geographic area or sub-area.

As used herein, "disabling signal" means a wirelessly transmitted signal from a disabling device to be received by a mobile device or computer. All forms of wireless communication are included within the meaning of "disabling signal". The wireless disabling signal may be a radio frequency, optical, or other wireless signal and may be, but is not necessarily, compliant with industry standards such as IEEE 802.11, Bluetooth®, Low Energy Bluetooth®, Zigbee® or other standards.

In an embodiment, as shown in FIG. 1, system 100 may comprise disabling device 101 and mobile device 102. Disabling device 101 may be mounted, installed or otherwise positioned in a vehicle, such as for example cars, trucks, buses, motorcycles, trains and other motor vehicles, or in the case of use of the system to control mobile device or computer use in a geographic area, disabling device 101 may be mounted or disposed on any available structure that provides the desired coverage of the disabling signal over the desired geographic area. Disabling device 101 may be encased in a compact enclosure, such as a polycase. Disabling device 101 may be compact for discrete mounting on a vehicle windshield or other structure. In the case of the use of the system to control mobile device or computer use in a vehicle, disabling device 101 may be positioned on the interior of the vehicle at or near the corner of the windshield, on the windshield near the rearview mirror or at another location within the vehicle. Disabling device 101 may comprise an optional motion detector 103, a processor or microcontroller unit (MCU) 104 in communication with optional motion detector 103, an optional cellular radio 105 in communication with MCU 104, a disabling signal generator 106 in communication with MCU 104, an optional power source 108 in communication with optional motion detector 103, MCU 104, optional cellular radio 105, and signal generator 106. Disabling device 101 may optionally comprise backup power source 112 in communication with MCU 104. Backup power source 112 may also be in communication with one or more of optional motion detector 103, optional cellular radio 105, and disabling signal generator 106. Disabling device 101 may optionally comprise solar cell 109 in communication with optional power source 108. Solar cell 109 may also be in communication with optional backup power source 112. Mobile device 102, further shown and described below and in FIG. 6, has a software application, or app, (e.g. Device Owner Application (DOA), mobile device management system or other applicable software) residing thereon that is capable of receiving a disabling signal from disabling device 101.

Still referring to FIG. 1, in an embodiment intended for limiting or controlling the use of a mobile device or computer in a vehicle, detector 103 may determine the motion status of a vehicle. Motion detector 103 may be, for example, an accelerometer, a gyroscope or both an accelerometer and a gyroscope. Motion detector 103 may detect, for example, acceleration, direction (up/down/forward/backward), speed or a combination thereof. Motion detector 103 transmits a signal comprising the motion status to MCU 104. Upon arrival at MCU 104, the signal is converted into a signal readable by MCU 104. This can be accomplished, for example, through the use of peripheral interface technology such as UART/SPI (universal asynchronous receiver/transmitter/serial peripheral interface) or I2C (Inter-Integrated Circuit). MCU 104 may use the motion status within the signal received from motion detector 103 to ascertain the motion status of the vehicle. In this embodiment, if the motion status indicates that the vehicle is in motion, MCU 104 instructs signal generator 106 to broadcast a disabling signal. MCU 104 interfaces with signal generator 106, which may be, for example, a 802.11 radio, a Bluetooth® beacon, a Bluetooth® low energy beacon or any device that can transmit a similar electronic signal or trigger (which may optionally comprise an identifier), via any known mechanism, for example, UART or SPI. Motion detector 103 may detect movement of the vehicle causing it to produce a motion status indicating that the vehicle is in motion. Alternatively, motion detector 103 may only produce a motion status indicating that the vehicle is in motion once the motion has surpassed a certain threshold, such as, for example a pre-determined speed, a predetermined acceleration or a combination thereof. If the vehicle is not moving or alternatively, has not exceeded a movement threshold, motion detector 103 may produce a motion status indicating that the vehicle is not in motion. Alternatively, motion detector may not produce a signal, which may be interpreted by MCU 104 to mean that the vehicle was not in motion and that the motion status should so indicate. MCU 104 may continuously or periodically monitor motion detector 103 for vehicle movement.

Still referring to FIG. 1, if a disabling signal has been broadcast by the disabling device 101 and mobile device or computer 102 is in range of the broadcasting signal, or in the case of embodiments which are intended to limit or control the use of a mobile device or computer within a geographic area, mobile device or computer 102 receives the disabling signal, and in response the Device Owner Application residing on mobile device 102 will alter the system configuration of mobile device 102 to restrict the user's ability to perform certain tasks including, for example, using the keyboard, using the touch screen or sending and/or receiving text messages, email messages, viewing video information displayed on a display or screen of the mobile device or computer, and/or place or receive phone calls. Use of some features, such as maps, dialing 911 and voice-activated calling may still be permitted by a system administrator as described further herein. The disabling signal can be, for example, a Bluetooth® low energy beacon signal (or transmission). In embodiments in which it is intended to limit or control the use of a mobile device or computer within a vehicle, broadcast of the disabling signal will continue or be performed at regular intervals (e.g. every 20 seconds). In such cases the broadcasting range of the disabling signal may be limited to only encompass the driver area or vehicle (e.g. 3-10 feet), and the broadcast of the disabling signal may continue after the motion status of the vehicle becomes non-moving for a predetermined amount of time (e.g. one to two minutes).

Still referring to FIG. 1, in embodiments in which it is intended to limit or control the use of a mobile device or computer within a vehicle, MCU 104 may ensure disabling device 101's operation by checking for connectivity to other disabling device components and for installation in and/or removal from a vehicle. This can be accomplished with internal programming and/or a physical or software switch. As an example of monitoring for installation and/or removal, if disabling device is attached to the vehicle (for example, on the windshield) using suction cups or adhesive or another similar mounting mechanism, a pressure switch can be used to detect installation and/or removal of the disabling device. In addition, MCU 104 monitors power source 108 for the status of the power supply.

Figure 10:
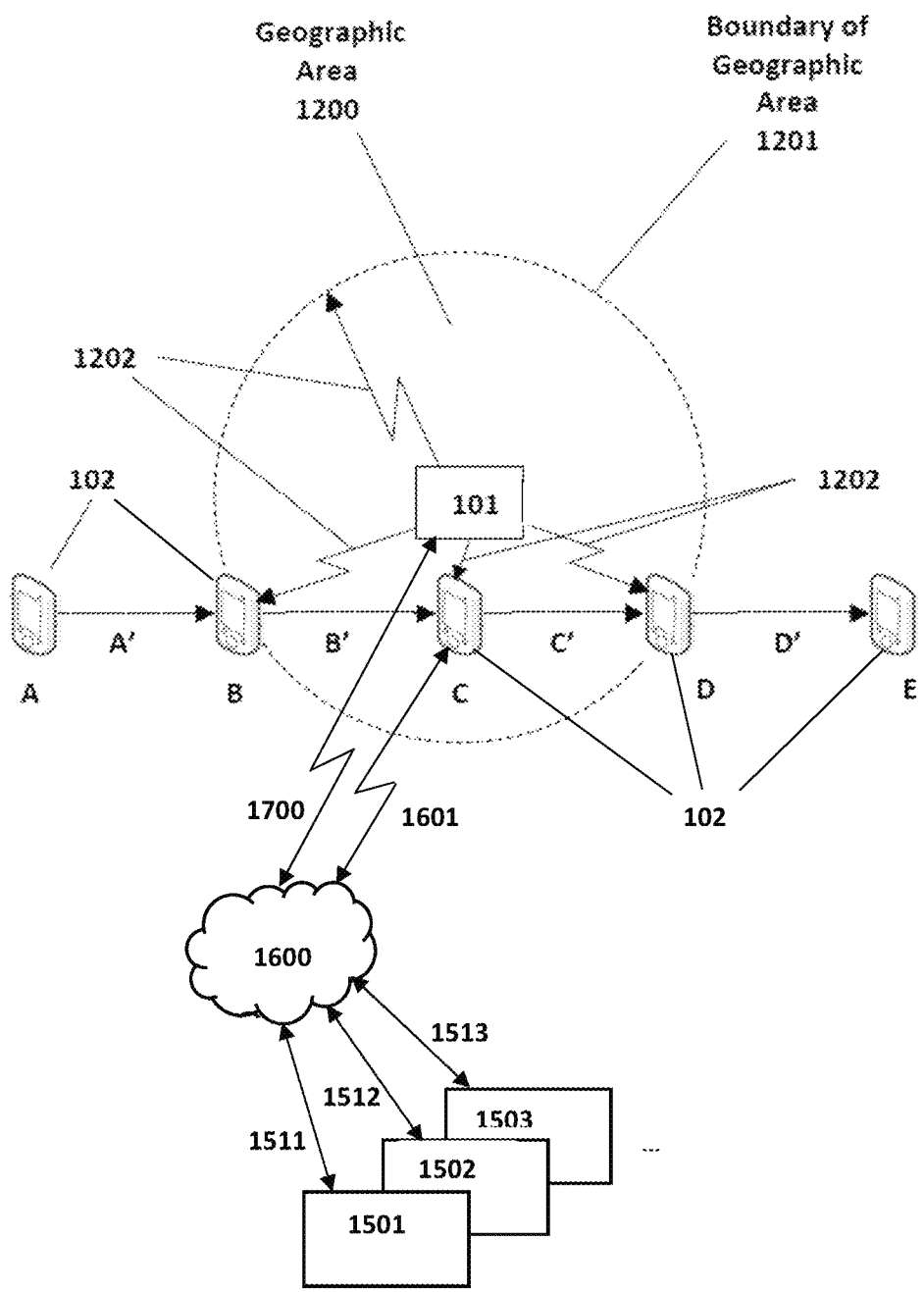
FIG. 10 depicts a system diagram for an embodiment of the invention in which the system and method of the device restrict mobile device functionality within a geographic area.

Still referring to FIG. 1, system 100 may optionally further include monitoring party's device 111. Cellular radio 105 may communicate wirelessly with monitoring party's device 111. Monitoring party's device 111 may monitor the status of disabling device 101 and the Device Owner Application running on mobile device 102. Optional cellular radio 105 may use GSM cellular modules (global system for mobile communications) or any other known transmission service. Optional cellular radio 105 may include a subscriber identity module (SIM) card and may be equipped with SMS text capabilities. Optional cellular radio 105, at the direction of MCU 104, may send messages/alerts, such as, for example a short message service (SMS) push notification comprising an identifier of the disabling device to monitoring party's device 111, when certain events occur. For example, a message may be sent when disabling device 101 is activated, when disabling device 101 is removed from the vehicle (in embodiments in which it is intended to limit or control the use of a mobile device or computer within a vehicle), when the available power in power source 108 or back-up power source 112 is low or when optional cellular radio 105 has low cellular service as well as periodic alerts showing the device is working properly. The Device Owner Application running on mobile device 102 may also send notifications, such as 'app installed', 'app disabled', or 'app functioning normally', to monitoring party's device 111. The notifications from the Device Owner Application may include mobile device 102's phone number. A monitoring party may be any person or entity with a legitimate interest in limiting the functionality of mobile device or computer 102 such as, for example and not by way of limitation, an insurance company or a concerned parent. Monitoring party's device 111 enables the monitoring party to receive information verifying that disabling device 101 and the Device Owner Application running on mobile device or computer 102 are operational. Optional cellular radio 105 may also be in communication with a system administrator computer of the system as shown via communication network 1600 by communication link 1700 as depicted in FIG. 10, for the purposes of providing bi-directional communication between a system administrator computer and disabling device 101 so that disabling device 101 status and health information about disabling device 101 may be transmitted to a system administrator computer such as 1511 depicted in FIG. 10, and configuration and other controlling information may be transmitted from a system administrator computer such as 1511 depicted in FIG. 10 to disabling device 101 through optional cellular radio 105 such that disabling device 101 may be remotely and wirelessly configured or report status information, or both. Configuration information may include identifying information to be included in the disabling signal 1202, signal generator 106 power level settings for controlling the strength of disabling signal 1202 in order to control the shape and extent of a predefined geographic area or volume 1200 as depicted in FIG. 10 in which it is desired to alter the system configuration of a mobile device or computer 102, or any other controllable parameter of disabling device 101. In such embodiments, MCU 104 may execute computer readable and executable instructions for generating such status reporting and communicate such status to a system administrator as described above; and also MCU 104 may execute computer readable and executable instructions for receiving such disabling device 101 configuration information from a system administrator as described above.

Still referring to FIG. 1, optional power source 108 may be, for example, a battery or a long life battery. Power source 108 may provide power to MCU 104, optional motion detector 103, optional cellular radio 105, and/or disabling signal generator 106 if the element itself is not self-powered or it may serve as a secondary power source for any self-powered element. Disabling device 101 may be hardwired to an external source of power. In this case, MCU 104, optional motion detector 103, optional cellular radio 105, and/or disabling signal generator 106 may draw power from the external power source. Power source 108 may then be used in the event disabling device 101 is removed from the source of external power for any reason.

Still referring to FIG. 1, optional backup power source 112, which may be for example a backup battery, may provide power to MCU 104 and optional cellular radio 105 to allow optional cellular radio 105 to send an alert to optional monitoring party 111 when MCU 104 detects that the power available in optional power source 108 is low. Backup power source 112 may also provide power to disabling signal generator 106 and optional motion detector 103 when the power available from optional power source 108 is low to allow disabling device 101 to operate continuously.

In embodiments in which it is intended to limit or control the use of a mobile device or computer within a vehicle, MCU 104 may also store information related to the driver/user or to the vehicle disabling device 101 is attached to. Such information may include the account number and name of the user and the make, year, and/or model of the vehicle. Such information can also be transmitted, as needed, via cellular radio 103 to, for example, monitoring party's device 111, or via signal generator 106 to, for example, mobile device 102.

Still referring to FIG. 1, optional solar cell 109 may be used to recharge optional power source 108 and/or optional backup power source 112.

In any embodiment of the system and method of the invention, the invention may comprise an optional remote server 113 having a database (whitelist) containing a list of media access control (MAC) addresses or other unique identifier assigned to the signal generator of each disabling device in operation. Optional remote server 113 may be in bi-directional, wireless communication with mobile device 102. This list, or whitelist, can be queried by the software running on a mobile device to determine if a received disabling signal is coming from a valid source. This may prevent a bad actor from attempting to disable a phone by sending a disabling signal from an unauthorized device.

Figure 2:
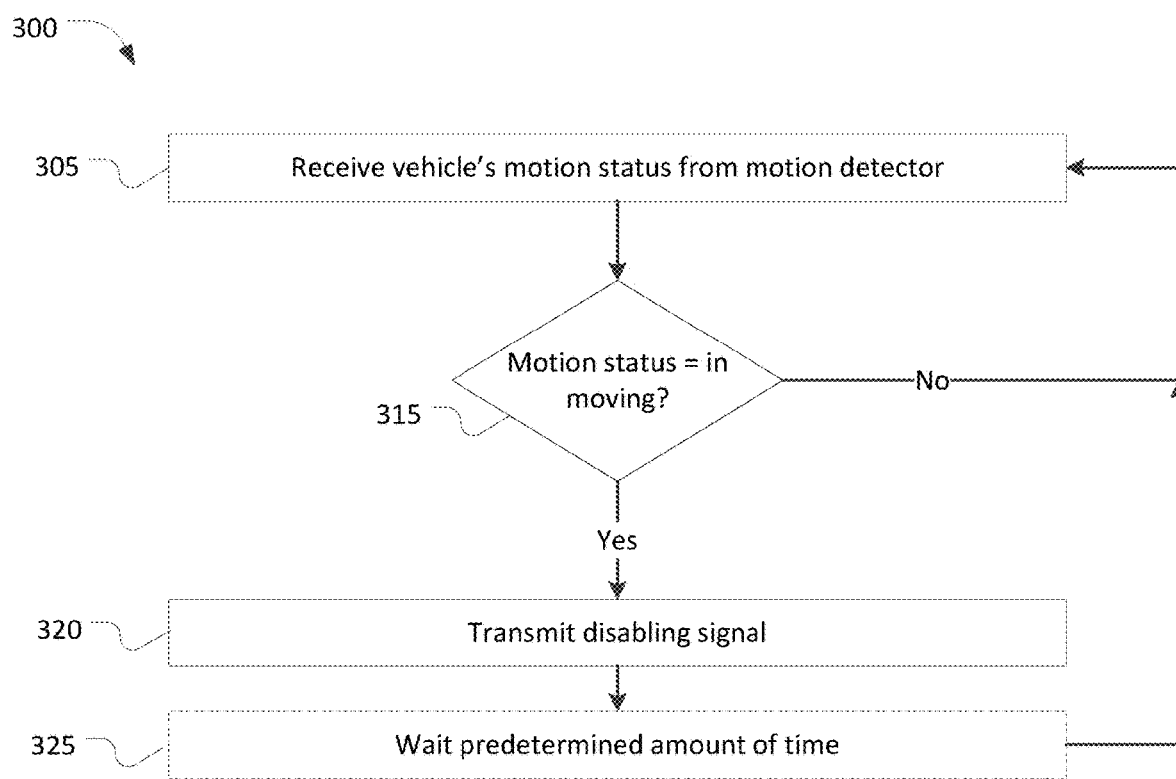
FIG. 2 is a flowchart of a method of limiting mobile device functionality in a vehicle from the perspective of the disabling device according to an embodiment of the present invention.

An embodiment of a method of the present invention for controlling mobile device or computer use in a vehicle, from the perspective of disabling device 101 (method 300), is illustrated in the flowchart in FIG. 2 with reference to disabling device 101 of FIG. 1. As shown in operation 305, disabling device 101 receives the motion status of the vehicle from motion detector 103. If, in operation 315, the motion status indicates that the vehicle is not in motion, disabling device 101 continues receiving the motion status from motion detector 103. Otherwise, disabling device 101, in operation 320, transmits a disabling signal using signal generator 106. Disabling device 101 then repeats the process. Optionally, disabling device 101 can, in operation 325, wait a predetermined amount of time before repeating this process.

Figure 3:
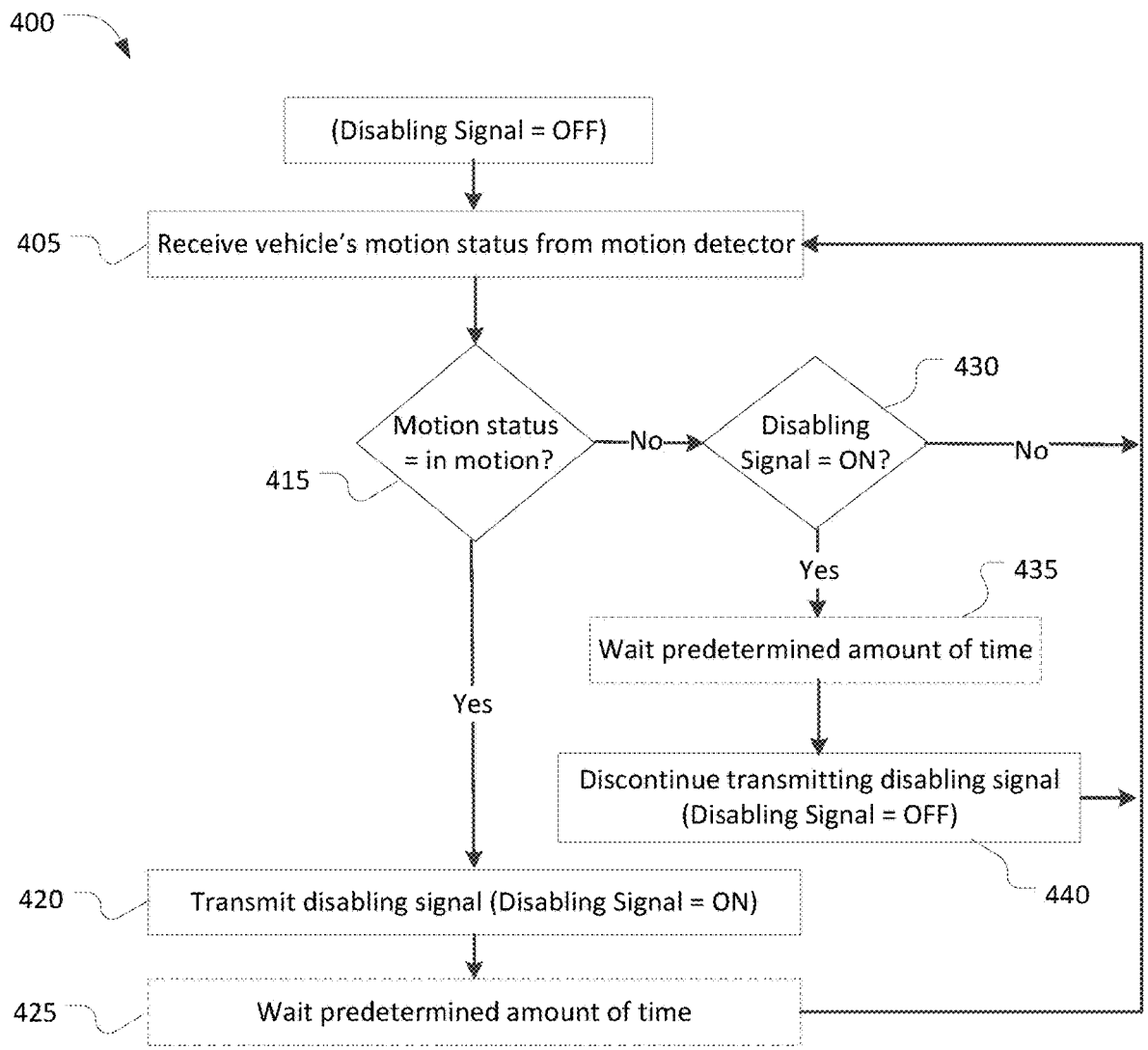
FIG. 3 is a flowchart of a method of limiting mobile device functionality in a vehicle from the perspective of the disabling device according to another embodiment of the present invention.

Another embodiment of a method of the present invention for controlling mobile device or computer use in a vehicle, from the perspective of disabling device 101 (method 400), is illustrated in the flowchart of FIG. 3 with reference to disabling device 101 of FIG. 1. As shown, method 400 begins initially with the disabling signal turned off. In operation 405, disabling device 101 receives the motion status of the vehicle from motion detector 103. If, in operation 415, the motion status indicates that the vehicle is in motion, disabling device 101, in operation 420, transmits a disabling signal using wireless signal generator 106. Broadcast of the disabling signal continues while the vehicle is in motion. Disabling device 101 then repeats the process. Optionally, disabling device 101 can, in operation 425, wait a predetermined amount of time before repeating this process. If, in operation 415, the motion status indicates that the vehicle is not in motion, then disabling device 101, in operation 430, determines if the disabling signal is turned on. If the disabling signal is off, then the process repeats. If the disabling signal is on, then it is turned off in operation 440 and the process repeats. Optionally, disabling device 101 can, in operation 440, wait a predetermined amount of time before turning off disabling signal and repeating the process. Waiting a predetermined amount of time (e.g. one to two minutes) before repeating the process, allows for the host vehicle to come to a temporary stop (e.g. at a stop light or stop sign) without allowing the mobile device to return to normal operations.

Optionally, MCU 104 can monitor signal generator 106 for endpoint connectivity (e.g. a connection to mobile device 102) if such connectivity is possible with the technology used for the signal generator. Once a connection is established, disabling device 101 may send a wireless signal or notification to mobile device 102.

Figure 4:
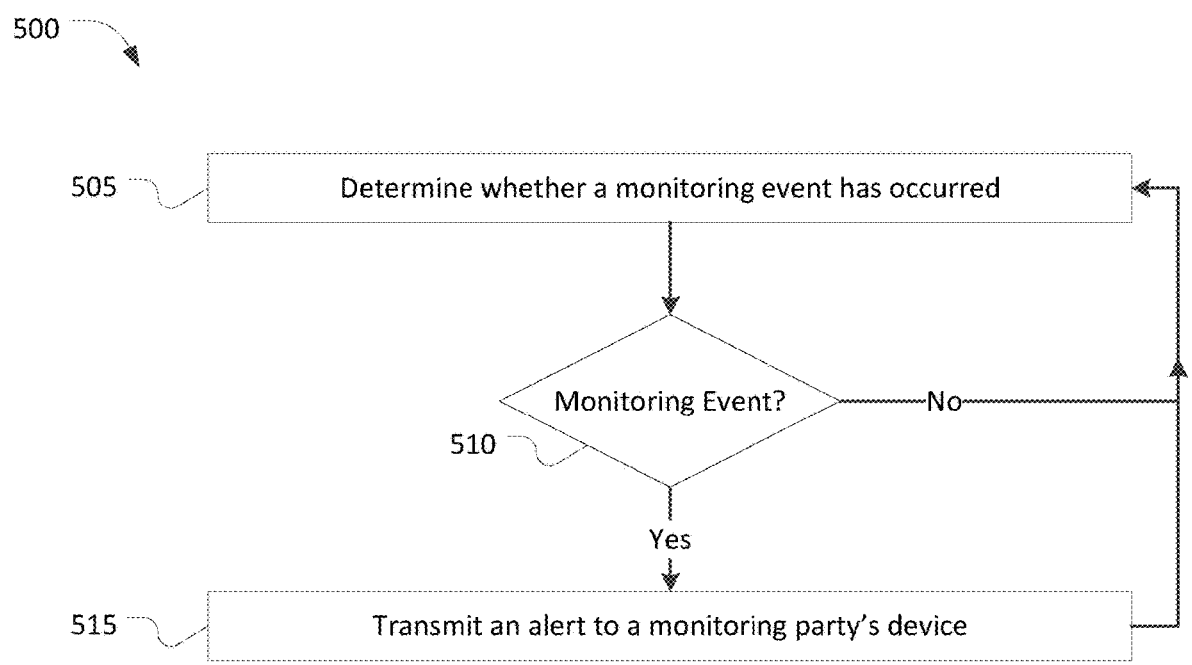
FIG. 4 is a flowchart of a method of issuing monitoring alerts from the perspective of the disabling device according to an embodiment of the present invention.

As discussed previously, optional cellular radio 105, at the direction of MCU 104, can send alerts, such as, for example a short message service (SMS) push notification, to a monitoring party's device 111, when certain events occur. An embodiment of a portion of the method of the present invention that issues these alerts is shown in FIG. 4. In operation 505 of method 500, disabling device 101 determines whether a monitoring event has occurred. If, in operation 510, a monitoring event has occurred, an alert will be transmitted to monitoring party's device 111 in operation 515. If, in operation 510, no monitoring event has occurred, then disabling device 101 continues checking for a monitoring event.

Figure 5:
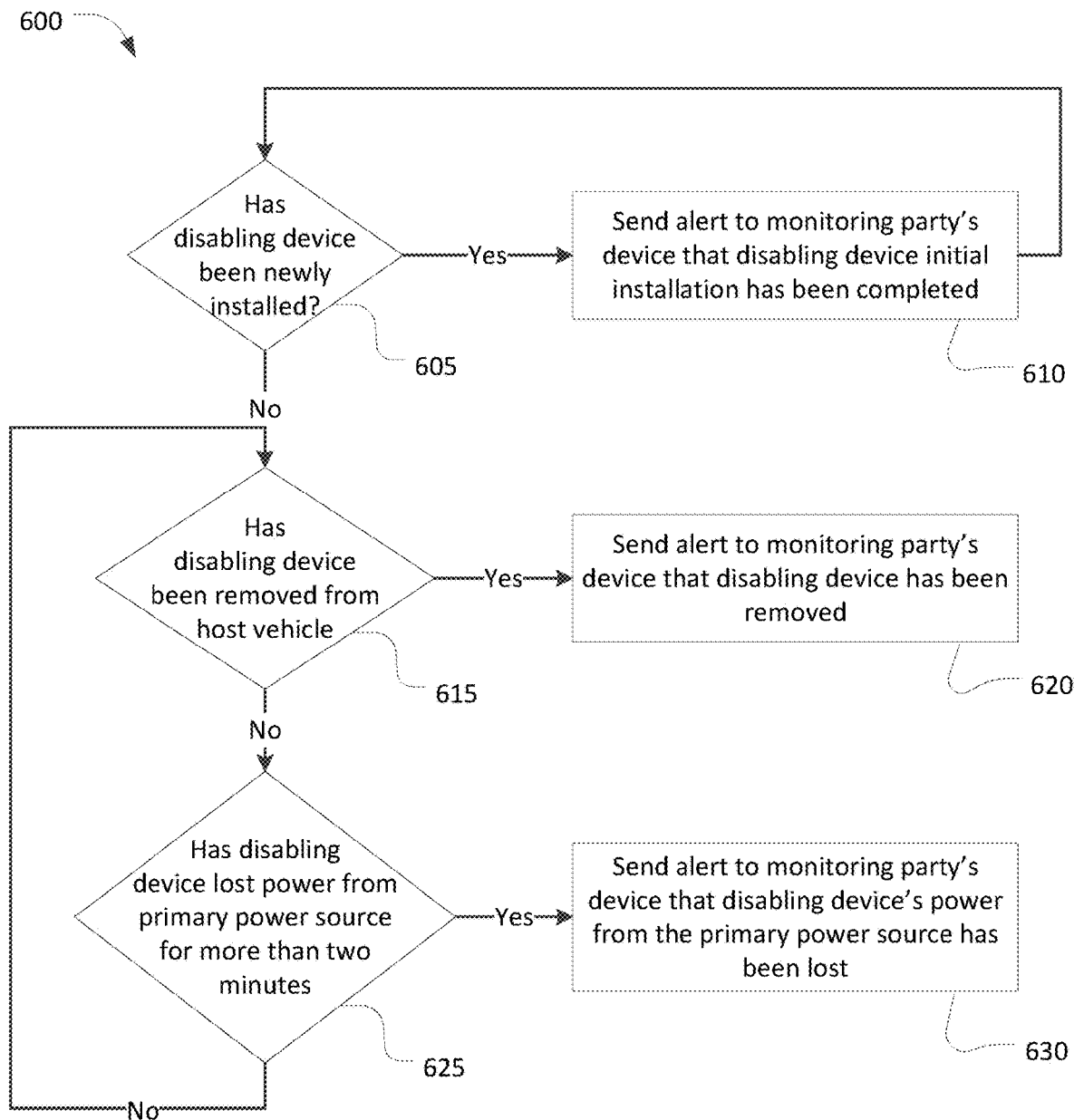
FIG. 5 is a flowchart of method of monitoring three exemplary events from the perspective of the disabling device according to an embodiment of the present invention.

Monitoring events may include, for example in embodiments in which it is intended to limit or control the use of a mobile device or computer within a vehicle, disabling device 101 being removed from a host vehicle, disabling device 101 being secured in a host vehicle, or disabling device 101 losing power for a predetermined amount of time. A method of monitoring these three exemplary events (method 600) is illustrated in FIG. 5 with reference to disabling device 101 of FIG. 1. In operation 605, disabling device 101 determines if it has been newly installed in a host vehicle. If disabling device has been newly installed, then, in operation 610, cellular radio 105 sends an alert to monitoring party's device 111 indicating that the initial installation of disabling device 101 is complete. If the disabling device has not been newly installed, then, in operation 615, disabling device 101 determines if it has been removed from the vehicle. If disabling device 101 has been removed from the vehicle, then, in operation 620, cellular radio 105 sends an alert to monitoring party's device 111 indicating that disabling device 101 has been removed. If disabling device 101 is still installed, disabling device 101 determines if it has lost power from power source 108 for a predetermined amount of time (e.g. two minutes). This can be determined by monitoring MCU 104's interface with power source 108. If disabling device 101 has lost power from power source 108 for a predetermined amount of time, cellular radio 105, which may be powered by backup power source 112 or its own power source, sends an alert to monitoring party's device 111 indicating that disabling device 101 has lost power from power source 108. If disabling device 101 has not lost power from power source 108, then the process continues monitoring for disabling device 101's removal from the vehicle (operation 615) and disabling device 101 losing power from power source 108 (operation 625).

In any embodiment of the invention, disabling device 101 can also perform a self-test to ensure that its disabling signal is transmitting and optional power source 108, if present, is operational. A monitoring alert may then be sent at predetermined intervals (e.g. every 30 days) to monitoring party's device 111 indicating that disabling device 101 is functioning properly.

Figure 6:
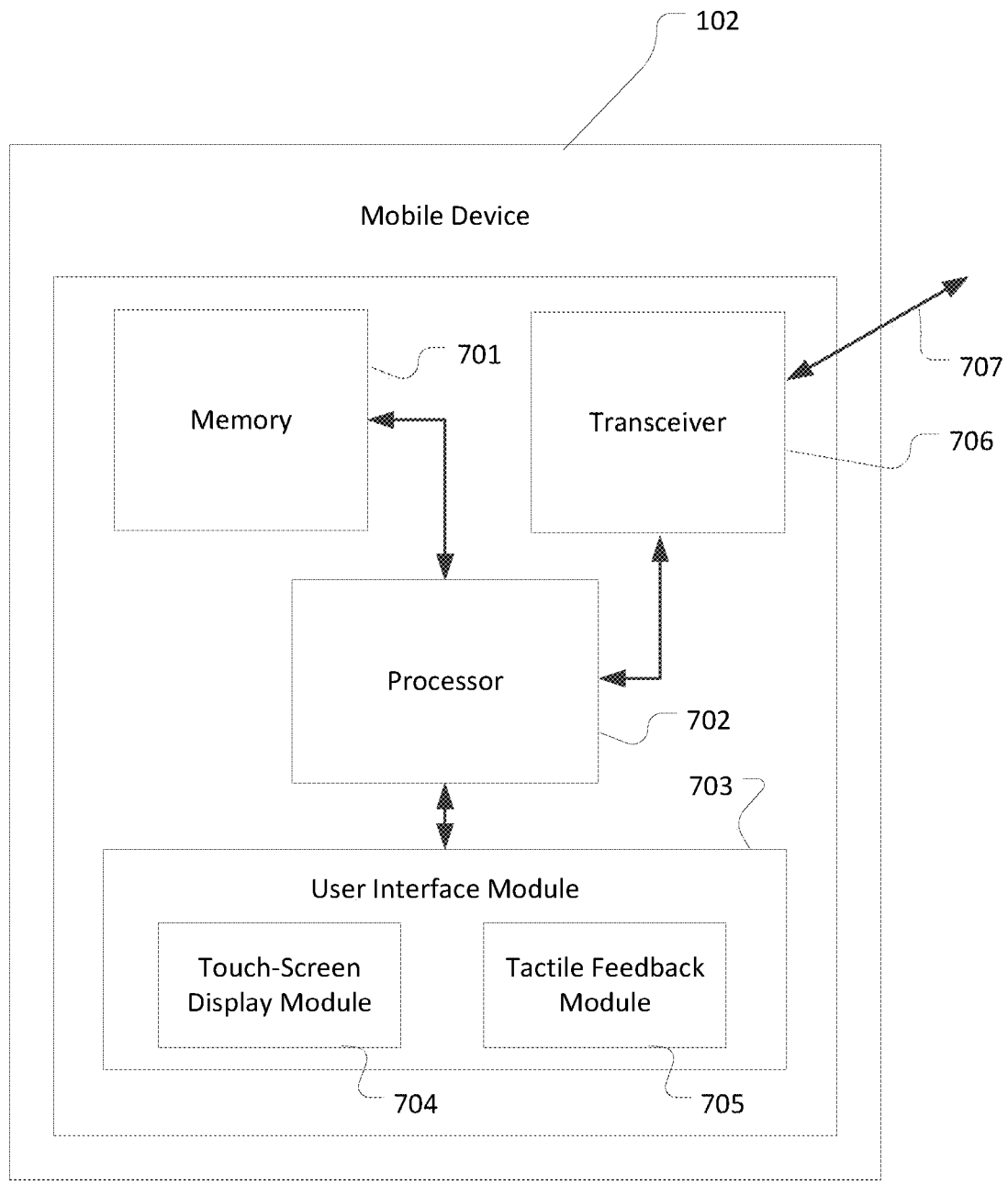
FIG. 6 is a block diagram illustrating an exemplary mobile device on which at least a portion of the method of limiting mobile device functionality in an operating vehicle may occur according to an embodiment of the present invention.

FIG. 6 is a block diagram of a mobile device or computer 102 according to an exemplary embodiment, which may be, for example mobile device or computer 102 as described herein and shown in FIGS. 1 and 10. The exemplary mobile device or computer 102 may include memory 701 in communication with processor 702 and user interface module 703, which includes touch-screen display module 704 and tactile feedback module 705, all of which is described in further detail below. Mobile device 102 may also comprise transceiver 706 for receiving or transmitting, or both, wireless signals 707, which may be any radio frequency (RF) signals such as WiFi, Bluetooth®, Low Energy Bluetooth®; Near Field Communications (NFC) or any other RF signal of any type or nature; optical signals such as infrared optical signals; or any other wireless signals known in the art. Processor 702 may be in communication with transceiver 707. In an embodiment, wireless signal 707 may be the wireless signal 1202 as depicted in FIG. 10. It should be understood, that a mobile device or computer 102 as illustrated and hereinafter described is merely illustrative of a mobile device or computer that could benefit from embodiments of the invention and, therefore, should not be taken to limit the scope of the invention. While one embodiment of the mobile device or computer is illustrated for purposes of example, other types of mobile electronic devices or computers, such as, but not limited to, mobile phones, smart phones, portable digital assistants (PDAs), tablets, mobile computing devices, gaming devices, laptop computers, desktop computers, media players, and all other types of mobile electronic systems, may readily employ embodiments of mobile device or computer 102.

Figure 7:
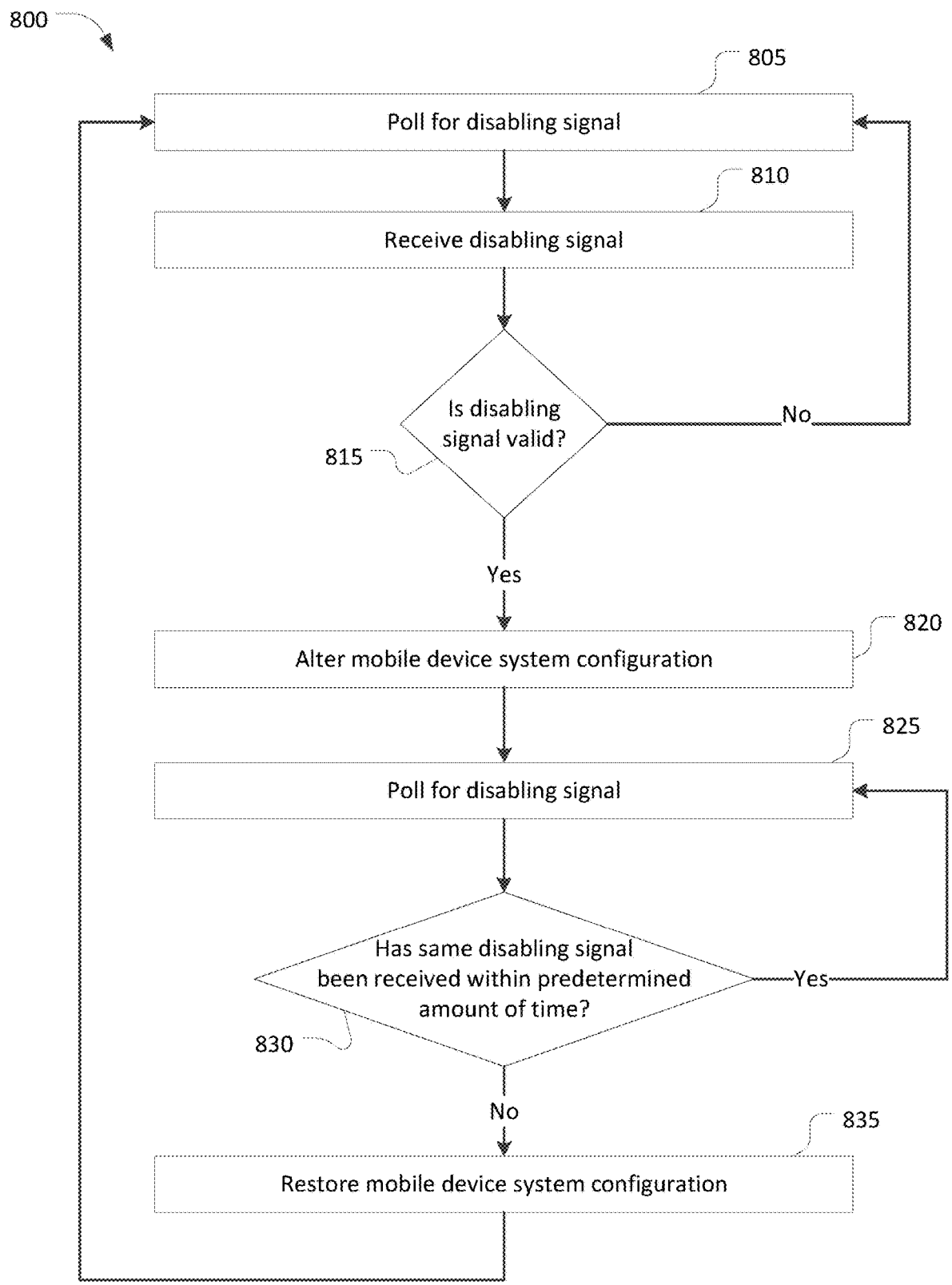
FIG. 7 is a flowchart of a method of limiting device functionality from the perspective of the mobile device according to an embodiment of the present invention.

An embodiment of the method of the present invention from the perspective of mobile device 102 (method 800) is illustrated in the flowchart of FIG. 7. As shown in operation 805, software, which may be a Device Owner Application, running on mobile device or computer 102 polls for a disabling signal. Once a disabling signal is received (in operation 810), the software, which may be a Device Owner Application, determines if it is valid in operation 815. If the disabling signal is not valid, the software continues polling for a disabling signal in operation 805. If the disabling signal is valid, then the software alters the system configuration of mobile device 102 in operation 820 to restrict the user's ability to perform certain pre-determined tasks. These tasks may include, for example, using the keyboard, or sending and/or receiving text messages and/or email messages, placing and/or receiving phone calls, placing and/or receiving phone calls when not in hands-free mode, or accessing unauthorized web sites. In operation 825, the software, which may be a Device Owner Application, continues to poll for a disabling signal. In operation 830, the software, which may be a Device Owner Application, determines if the same disabling signal has been received within a predetermined period of time. If it has, then the software, which may be a Device Owner Application, continues to poll for a disabling signal (operation 825). If the same disabling signal has not been received within a predetermined period of time, the software, which may be a Device Owner Application, restores the system configuration of mobile device 102 in operation 835.

Figure 8:
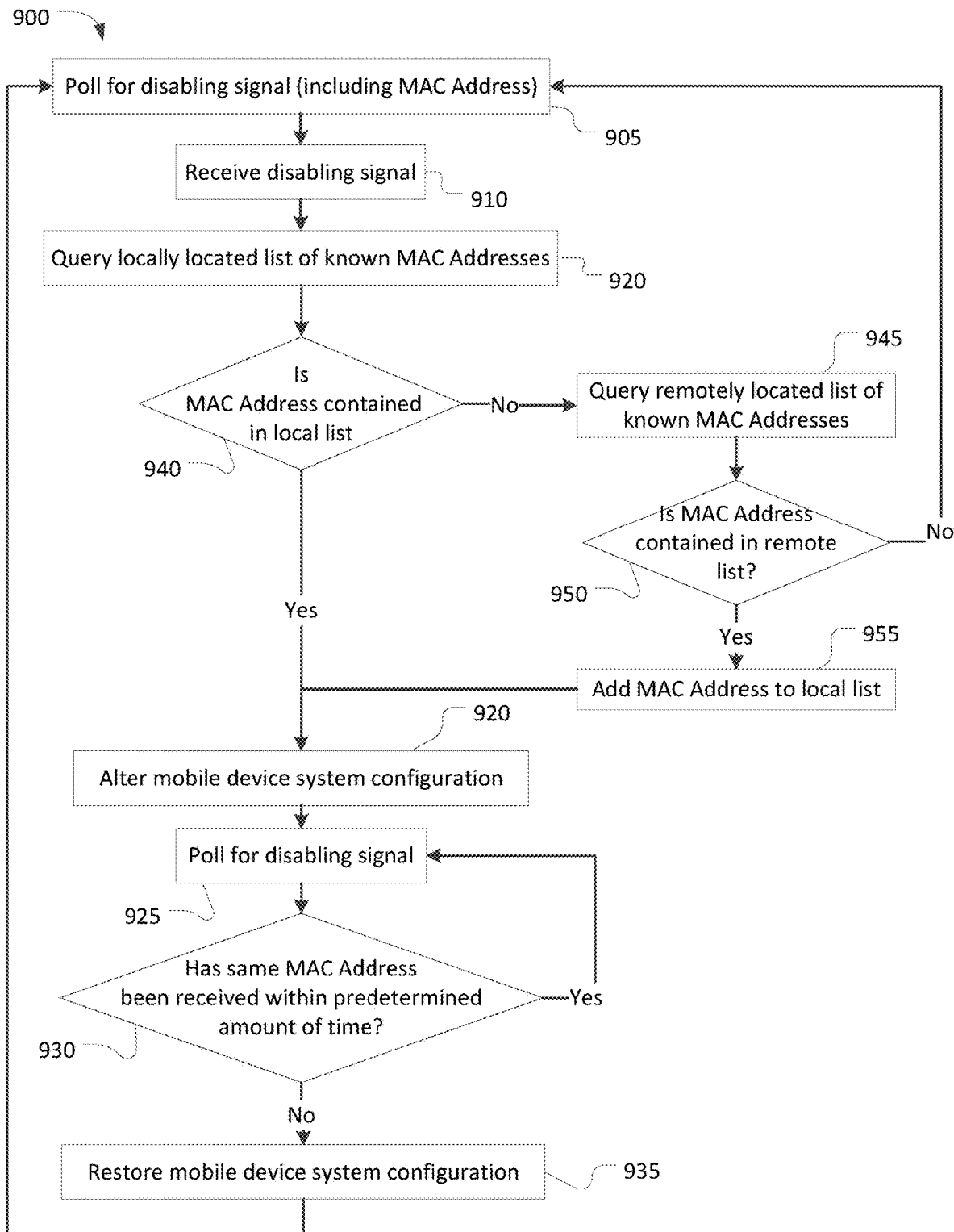
FIG. 8 is a flowchart of a method of limiting mobile device functionality from the perspective of the mobile device according to an embodiment of the present invention.

Another embodiment of the method of the present invention from the perspective of mobile device 102 (method 900) is illustrated in the flowchart of FIG. 8. As shown in operation 905, software, which may be a Device Owner Application, running on mobile device or computer 102 polls for a disabling signal. The disabling signal, which may be, for example a Bluetooth® beacon signal (or transmission), may includes identifiers, such as, for example, a universally unique identifiers (UUID) or a MAC address. Once a disabling signal is received by mobile device or computer 102 (in operation 910), the software, which may be a Device Owner Application, queries, in operation 920, a locally located list of known identifiers to determine, in operation 940, if the identifier received in the disabling signal is contained in the local list. If the identifier is not in the local list, then, in operation 945, a remotely located list of known identifiers is queried to determine, in operation 950, if the identifier is contained in the remote list. If the identifier is not contained in the remote list, the identifier is not recognized and the software continues polling for a disabling signal in operation 905. If the MAC address is contained in the remote list, the MAC address is added to the local list in operation 955. Once a valid MAC address has been confirmed, the software alters the system configuration of mobile device 102 in operation 920 to restrict the user's ability to perform certain tasks including, for example, using the keyboard, or sending and/or receiving text messages, email messages, and/or phone calls. In operation 925, the software, which may be a Device Owner Application, continues to poll for a disabling signal. In operation 930, the software determines if the same network identifier has been received within a predetermined period of time. If it has, then the software, which may be a Device Owner Application, continues to poll for a disabling signal (operation 925). If the same disabling signal has not been received within a predetermined period of time, the software restores the system configuration of mobile device 102 in operation 935.

Figure 9A:
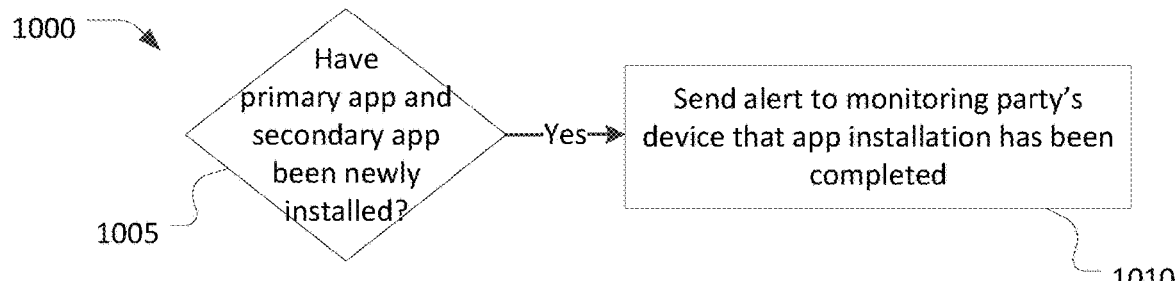
FIGS. 9A through 9C are flowcharts of methods of issuing monitoring alerts from the perspective of the mobile device according to another embodiment of the present invention.
Figure 9B:
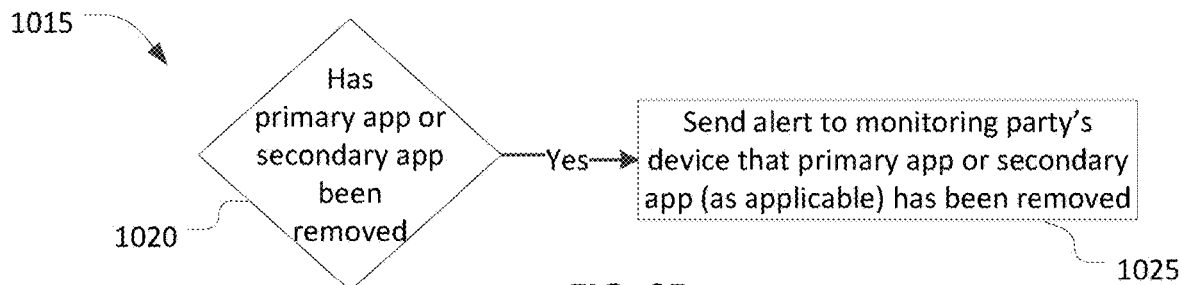
Figure 9C:
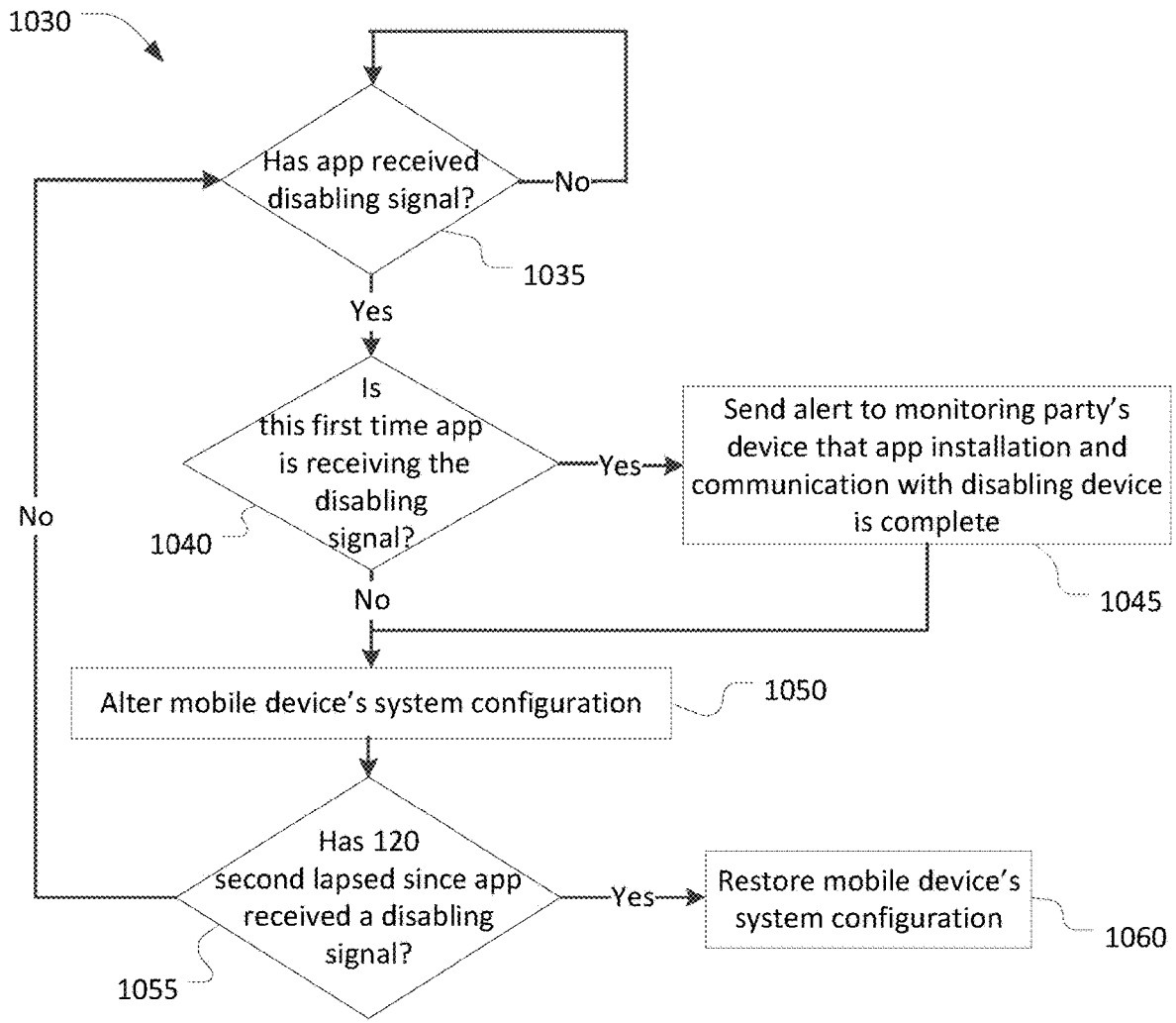

In an alternate embodiment, the software running on mobile device 102 can protect itself from tampering and verify its own operable status by transmitting alerts, such as, for example, a SMS push notification containing, for example, mobile device 102's phone number, to monitoring party's device 111. Monitoring events can include the software being installed on mobile device 102 or the software being disabled. The software running on mobile device 102 may comprise two separate apps—a primary system app and a secondary app. The primary app may be monitored by the secondary app. The purpose of the secondary app is to send an alert to monitoring party device 111 in the event of removal of the primary app. The primary app also monitors the secondary app and sends an alert to monitoring party device 111 in the event of removal of the secondary app. In this respect the primary and secondary app independently monitor each other for removal, making the app portion of the system self-protecting. Methods (methods 1000, 1015, and 1030) that issue exemplary alerts originating from mobile device 102 are shown in FIGS. 9A through 9C. As shown in FIG. 9A, method 1000 determines, in operation 1005, if the primary app and the secondary app have been newly installed on mobile device 102. If the software has been newly installed, then, in operation 1010, mobile device 102 sends an alert to monitoring party's device 111 indicating that the software installation has been completed. As shown in FIG. 9B, method 1015 determines, in operation 1020, if the primary app or the secondary app has been removed. If either app has been removed, then, in operation 1025, an alert is sent to monitoring party's device 111 indicating that the primary app or secondary app (as applicable) has been removed. As shown in FIG. 9C, method 1030 determines, in operation 1035, if mobile device 102 has received a disabling signal. If no disabling signal has been received, then the software continues to wait for the disabling signal to arrive. If a disabling signal has been received, then, in operation 1040, the software determines if it is the first time mobile device 102 is receiving the disabling signal. If this is not the first time mobile device 102 has received a disabling signal, then the system configuration of mobile device 102 is altered in operation 1050. If this is the first time mobile device 102 has received a disabling signal, then, in operation 1045, an alert is sent to monitoring party's device 111 indicating that the software installation and communication with disabling device 102 has completed. The system configuration of mobile device 102 is then altered in operation 1050. After mobile device 102's system configuration has been altered, the software, in operation 1055, determines if a predetermined amount of time (e.g. two minutes) has lapsed since mobile device 102 received a disabling signal. If not, then the software continues polling for a disabling signal in operation 1035. If the predetermined amount of time has lapsed then the software restores the system configuration of mobile device 102 in operation 1060.

The software running on mobile device 102 can also perform a self-test to ensure that it is receiving disabling signals at expected intervals (e.g. every 15 seconds or twice within any 30 second window) and it is altering mobile device 102's system configuration upon receipt of a valid disabling signal. A monitoring alert can then be sent at pre-determined intervals (e.g. every 30 days) to monitoring party's device 111 indicating that the software running on mobile device 102 is functioning properly.

The following are exemplary scenarios demonstrating pre-operational functionality of embodiments of the present invention that are directed to limiting or controlling the functionality of a mobile device or computer in a vehicle.

Disabling device set-up—the disabling device is intact but not in the vehicle:

Motion detector: Inactive.

Power source (battery): Inactive (charged).

MCU: Inactive.

Signal generator: Inactive.

Cellular Radio: Inactive.

Disabling device installed—the vehicle is not moving:

Motion detector: Power available from disabling device's battery

Power source (battery): Inactive (charging).

MCU: Recognizes connectivity to the motion detector via internal programming, physical switch or software switch and initiates a monitoring alert (e.g. push noti fication); analyzes the signal from the motion detector for the motion status of the vehicle.

Signal generator: Inactive.

Cellular Radio: Transmits 'Disabling device installed' alert to the monitoring party's device.

Vehicle not moving; disabling device installed:

Motion detector: Active

Power source (battery): Active

MCU: Active; monitoring the motion detector

Signal generator: Inactive

Cellular Radio: Inactive

Disabling device is removed:

Motion detector: Inactive

Power source (battery): Active (discharging); Powers the MCU and the cellular radio MCU: Recognizes the lack of connectivity of the disabling device to the vehicle via internal programming, physical switch or software switch; engages the battery and initiates a monitoring alert indicating that the disabling device has been disconnected Signal generator: Inactive Cellular Radio: Transmits monitoring alert (e.g. push notification) indicating that the disabling device has been disconnected to the monitoring party's device The following are exemplary scenarios demonstrating operational functionality of embodiments of the present invention.

Vehicle not moving; disabling device installed:

Motion detector: Power available from disabling device battery

Power source (battery): Active (charging)

MCU: Recognizes connectivity to the motion detector via internal programming, physical switch or software switch; analyzes the signal from the motion detector for the motion status of the vehicle Signal generator: Inactive Cellular Radio: Inactive Vehicle moving; disabling device installed Interface: Power available from the disabling device is battery Power source (battery): Active MCU: Recognizes connectivity to the motion detector via internal programming, physical switch, or software switch; analyzes the signal from the motion detector for the motion status of the vehicle Signal generator: Sends the disabling signal nominally every twenty (20) seconds Cellular Radio: Inactive Vehicle in motion or not in motion; disabling device Installed; power from (primary) battery is unavailable for a predetermined period of time (e.g. two minutes)

Motion detector: Inactive

Power source (Primary battery): Inactive; not charging

Backup Power Source (Back-up battery): Active; Powers the MCU and the cellular radio MCU: Recognizes connectivity to the motion detector via internal programming, physical switch or software switch; analyzes the signal from the motion detector for the motion status of the vehicle; recognizes (primary) battery power is unavailable for predetermined period of time (e.g. two minutes); initiates monitoring alert (e.g. push notification) indicating no (primary) battery power to the disabling device for a defined time period Signal generator: Inactive Cellular Radio: Transmits a monitoring alert to the monitoring party's device that the (primary) battery is not operational Exemplary Electronic Devices—Mobile Device and Disabling Device FIGS. 1 and 6 are block diagrams illustrating exemplary embodiments of disabling device 101 and mobile device or computer 102, respectively and collectively "the devices". It should be understood these exemplary embodiments are merely illustrative of disabling device and a mobile device or computer that could benefit from embodiments of the invention and, therefore, should not be taken to limit the scope of the invention. Moreover, the apparatus of an example embodiment need not be the entire device, but may be a component or group of components of the device in other example embodiments.

Regarding mobile devices or computers 102, the devices may readily employ embodiments of the invention regardless of their intent to provide mobility. In this regard, even though embodiments of the invention are described in conjunction with a mobile device, it should be understood that embodiments of the invention may be utilized in conjunction with a variety of other electronic devices.

The devices may each comprise a processor or other processing circuitry. As used in this application, the term 'circuitry' refers to at least all of the following: hardware-only implementations (such as implementations in only analog and/or digital circuitry) and to combinations of circuits and software and/or firmware such as to a combination of processors or portions of processors/software including digital signal processor(s), software, and memory(ies) that work together to cause an apparatus, such as a mobile phone or tablet, to perform various functions and to circuits, such as a microprocessor(s) or portion of a microprocessor(s), that require software or firmware for operation, even if the software or firmware is not physically present. This definition of 'circuitry' applies to all uses of this term in this application, including in any claims.

As a further example, as used in this application, the term "circuitry" would also cover an implementation of merely a processor, multiple processors, gate arrays, programmable logic arrays, field-programmable gate arrays, discrete logic or a portion of a processor and its (or their) accompanying software and/or firmware.

Further, the processor(s) may comprise functionality to operate one or more software programs by executing non-transitory computer readable and executable instructions that comprise such programs, which may be stored in memory and which may, among other things, cause the processor to implement at least one embodiment including, for example, one or more of the functions described above. The mobile device may comprise a user interface for providing output and/or receiving input. The mobile device may comprise an output device such as a ringer, a conventional earphone and/or speaker, a microphone, a video or visual display, and/or a user input interface, which are coupled to the processor. The user input interface, which allows the electronic device to receive data, may comprise means, such as one or more devices that may allow the electronic device to receive data, such as a microphone, a keypad, a touch-screen or touch display, for example if the display comprises touch capability, and/or the like.

The devices may comprise a physical memory device including, in one embodiment, volatile memory, such as, but not limited to, volatile Random Access Memory (RAM) including a cache area for the temporary storage of data and non-transitory computer readable and executable instructions. The devices may also comprise other physical memory, for example, non-volatile memory, which may be embedded and/or may be removable. The non-volatile memory may comprise an EEPROM, flash memory or the like. The memories may store any of a number of pieces of information, executable instructions, and data. The information, executable instructions and data may be used by the devices to implement one or more functions of the devices.

Figure 11:
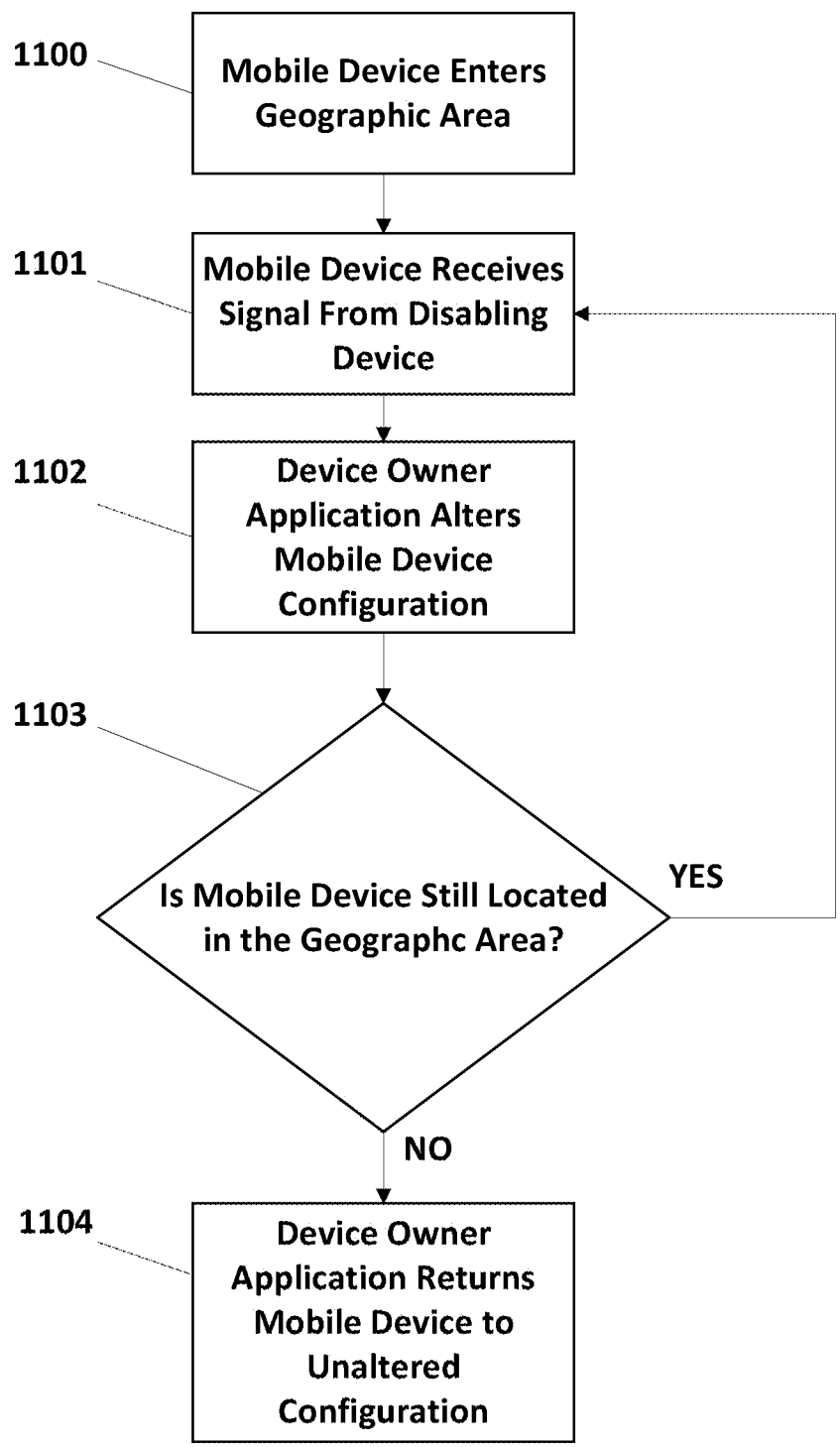
FIG. 11 depicts a flow diagram for an embodiment of the invention in which the system and method of the device restrict mobile device functionality within a geographic area.

A geographic-based embodiment of the system and method of the invention is depicted in FIG. 10, which depicts an exemplary embodiment of the system and FIG. 11, which depicts an exemplary flow diagram of the steps of the method.

Referring now to FIGS. 10 and 11, at least one disabling device 101 may transmit a disabling signal 1202 within and to the extent of a geographic area 1200, which has a boundary 1201. A plurality of disabling devices 101, which need not be co-located, may be used in order to create any desired shape or size geographic area 1200. Geographic area or volume 1200 is depicted as circular in shape in FIG. 10, but this shape is exemplary only. Geographic area or volume 1200 may be any arbitrary shape in which disabling signal 1202 is able to be received by mobile device or computer 102. The boundary 1201 may also be a three dimensional surface. Geographic area or volume 1200 is not limited to a plane, in other words confined to only two dimensions, but may be any three dimensional shape and thus the term "geographic area" includes within its meaning "geographic volume", wherein the volume is enclosed by a three dimensional boundary surface 1201. In an embodiment, a desired geographic area or volume 1200 may be achieved by adjusting the output power of the disabling signal of one or more disabling devices 101 and locating each of the disabling devices 101, or their transmitting apertures which may be, for example, antennas or optical transmitters, at desired locations in order to achieve a desired shape for geographic area or volume 1200 and its corresponding boundary 1201. As such, geographic area or volume 1200 could be, by way of example and not limitation, a hemispherical shape or any desired shape. In such cases the boundary 1201 of geographic area 1200 would comprise a surface area. Whether two dimensional or three dimensional, geographic area 1200 may take any arbitrary shape by the appropriate placement of antennas through which disabling signal 1202 is transmitted or by shaping antenna radiation patterns using techniques known in the art, or alternatively, a plurality of disabling devices 101 transmit disabling signals, or GPS or GNSS based geofencing is used in order to achieve a predefined desired geographic area or volume 1200 and boundary 1201. Geographic area or volume 1200 and disabling signal, or signals, 1202 may be utilized to provide mobile device functionality limitation as described herein for any area or volume in which mobile device or computer functional limitation is desired, for example work areas designated by employers such as retail store sales floors, warehouses, factory and manufacturing facilities, and offices; areas related to vehicular traffic such as crosswalks and intersections; areas in which danger may be present requiring that a mobile device user stay alert and not be distracted by the use of a mobile device such as subway or train platforms; areas in which specified activities are expected to occur requiring a mobile device user to pay attention and not be distracted by the use of a mobile device such as classrooms or lecture halls; and any other geographic area in which it is desired that person's situational awareness not be diminished or subject to distraction. As but one non-limiting example, disabling devices 101 may be placed along a roadway for a distance corresponding to a section of roadway of particularly high congestion and cross-wise traffic intersections such that a mobile device or computer 102 is within the boundary 1201 of geographic area or volume 1200 for a desired distance, effectively limiting the functionality of a mobile device or computer 102 while it is located within geographic area or volume 1200.

Still referring to FIG. 10, in embodiments, when a mobile device or computer 102 is positioned outside the boundary of geographic area 1201 such as in position A, the receiver of mobile device or computer 102 does not receive disabling signal 1202 transmitted by disabling device 101, because mobile device or computer 102 is outside boundary 1201 and is therefore outside the coverage area of disabling signal 1202. As mobile device or computer 102 is moved to the boundary 1201 along direction A' to position B, corresponding to step 1100 of FIG. 11, the receiver of mobile device or computer 102 is able to receive disabling signal 1202 because it has moved across the boundary 1201 into geographic area or volume 1200 and is therefore within the coverage area of disabling signal 1202. When mobile device or computer 102 crosses boundary 1201 into geographic area or volume 1200 the Device Owner Application on mobile device or computer 102 receives disabling signal 1202, corresponding to step 1101 of FIG. 11, and responds to disabling signal 1202 by altering mobile device or computer 102's system configuration as described elsewhere herein, corresponding to step 1102 of FIG. 11, which may include, but is not limited to, restricting the mobile device's ability to send and receive text messages and email messages; restricting the mobile device's ability to display, access, receive information from, or transmit information to administrator-selected predetermined social media services and/or websites; restricting the mobile device's ability to respond to user input; restricting the mobile device's ability to place and receive phone calls; restricting the mobile device's ability to place and receive phone calls requiring user interaction with a touch screen or a keyboard of the mobile device; restricting the mobile device's ability to utilize a web browser application; restricting the mobile device's web browser from accessing predetermined unauthorized web sites; any other predetermined restriction of mobile device functionality as may be desired; and applying these restrictions during specific administrator-selected time periods in any combination of limitations, during any duration and combination of time periods. As mobile device or computer 102 moves along direction B' to position C, the mobile device receiver continues to receive disabling signal 1202 because mobile device or computer 102 is still in geographic area or volume 1200, i.e., mobile device 102 remains within the geographic area boundary 1201, and the Device Owner Application on mobile device or computer 102 continues to limit the functionality of mobile device or computer 102 as described, corresponding to the "YES" leg of the decision step 1103 of FIG. 11. As mobile device or computer 102 moves along direction C' to position D, the mobile device receiver continues to receive disabling signal 1202, and the Device Owner Application on mobile device or computer 102 continues to receive disabling signal 1202 and to limit the functionality of mobile device or computer 102 in response to disabling signal 1202 as described, however as mobile device moves along direction D' and exits geographic area or volume 1200 by crossing geographic area boundary 1202 as it moves towards position E, mobile device or computer 102 is no longer able to receive disabling signal 1202, corresponding to the "NO" leg of step 1103 of FIG. 11. When mobile device or computer 102 moves out of geographic area 1200 by crossing boundary 1201 moving in direction D' towards position E and is no longer able to receive disabling signal 1202, the Device Owner Application on mobile device or computer 102 may respond to loss of disabling signal 1202 by returning mobile device or computer 102 to an unaltered system configuration, or to an alternative configuration specified by an administrator. In an embodiment directed to controlling or limiting the functionality of a mobile device or computer 102 in a geographic area or volume 1200, the disabling device 101 depicted in FIG. 10 may comprise only a disabling signal generator 106; or a disabling signal generator 106 and an MCU 104, or any other combination or subset of the functions depicted in FIG. 1.

Still referring to FIG. 10, in a further embodiment of a geographic-based embodiment of the system and method of the invention, the invention may comprise one or more system administrator computers 1501, 1502, 1503, and so on to any number of system administrator computers, remotely connected to a user's mobile device or computer 102 via any communication network 1600 and wireless communication links 1601, including but not limited to the Internet, via communication channels 1511, 1512, 1513, and so on, respectively. System administrators may, by inputting data into a web-accessible web portal displayed on a system administrator computer such as 1501, and using a set of non-transitory computer readable and executable instructions running on a processor of the system administrator computer 1501, 1502, or 1503 that is in communication with the mobile device or computer 102 through any wireless means such as, for example, a cell-based radio network 1601 connected to the Internet 1600, readily and remotely establish, for each mobile device or computer, or each user group or super group of users, the system configuration parameters for altering the system configuration of such devices and user groups and select authorized web sites for which such devices and user groups will be granted access, and to communicate such selection of system configuration parameters for altering the system configuration of mobile devices and computers 102 and authorized web sites to the Device Owner Application residing on a user's mobile device or computer 102, such that the mobile device or computer 102 system configuration is altered as desired and such mobile device or computer 102 is allowed to access authorized web sites and is not allowed to access other, non-authorized web sites, and to establish time periods and dates such selected authorized web sites may be accessed by the mobile device or computer, if such control is desired, as established by a system administrator. The web portal may allow a system administrator to enter data establishing system configuration parameters and for desired levels of web site access based on the mobile device or computer user's job function or based on any user groups to which the mobile device or computer 102, or user, may belong.

Still referring to FIG. 10, in an embodiment, optional cellular radio 105 (shown in FIG. 1) may also be in communication with a system administrator computer 1501, 1502, and/or 1503 of the system of the invention as shown via communication network 1600 and communication link 1700, for the purposes of providing bi-directional communication between a system administrator computer and disabling device 101 so that disabling device 101 status and health information about disabling device 101 may be transmitted to a system administrator computer such as 1501, and configuration and other controlling information may be transmitted from a system administrator computer such as 1501 to disabling device 101 through optional cellular radio 105 (shown in FIG. 1) such that disabling device 101 may be remotely and wirelessly configured or report status information, or both.

In the example in which the invention is used by an employer to restrict employee access to mobile devices or computers 102, it may be advantageous for a system administrator, via the web portal implemented by a processor of a system administrator computer 1501 executing computer readable and executable instructions stored in physical memory on that system administrator computer 1501, to allow employees access to work scheduling, company inventory, or company policy websites, with the extent or scope of access determined by that employee's job function or user group. "User groups" may be used to identify groups of mobile device or computer 102 users for whom it is desired to grant similar authorization for web site use or other mobile device or computer 102 function authorizations or restrictions. For example, and not by way of limitation, a system administrator may allow a manager to have greater or different website access than a supervisor; or the system administrator may allow a user group comprised of a plurality of physicians at a hospital greater website access than a group of nutritionists, and so on. In a non-limiting example of use of the invention in a school or teaching environment, it may be advantageous for a school system administrator via the web portal to allow students access to certain websites for usage in the classroom for educational purposes. This access may be readily and remotely established for essentially any desired website or websites, for any time period, and for any desired dates. For example, a 12th grade class of advanced math students may be allowed greater access to educational websites than a 9th grade class of beginning math students. In a non-limiting home use example, the system administrator (nominally parents) may allow greater web site access for longer time period to older children than younger children, for example the older children have certain website access for hours other than 10:00 pm to 6:00 am, while the younger children have access for hours other than 08:30 pm to 7:00 am to facilitate uninterrupted sleeping. Additionally for safety purposes, in any instance, via the web portal, a system administrator may immediately disengage the system controls on all of the mobile devices or computers 102 within a defined geographic region so as to reinstitute full mobile device or computer usage to allow full mobile device or computer 102 communication capabilities by the mobile device or computer users. A non-limiting example of the need for this feature would be the presence of a terrorist or active shooter in a school or work situation, where communication with all students or employees is an important safety aspect of mobile devices in particular.

Referring now to FIG. 12, the system of the invention may comprise a plurality of system administrators using system administrator computers to establish a hierarchy or other grouped architecture to use the system and method of the invention to control mobile device users' access to web sites on a user group/sub group or other grouped basis. In an exemplary, non-limiting embodiment comprising a plurality of system administrators, a hierarchy of system administrators may be established such that super user groups that are comprised of a plurality of user groups, may be established in order to effectuate efficient control of user mobile devices or computers on an increasingly global basis. For example, a non-limiting school scenario is depicted in FIG. 12. User groups may be implemented at the classroom level at the lowest level of hierarchy, shown as Hierarchy Level 4 in FIG. 14. Each classroom user group, labeled as "CLASSROOM 1" through "CLASSROOM 24" where each CLASSROOM designation is comprised of students who are located in twenty-four separate classrooms, is assigned to be a part of a next higher Hierarchy Level 3 school user group. Thus, referring to FIG. 12, SCHOOL A user group consists of four user groups CLASSROOM 1-4. Thus, at Hierarchy Level 3, a school-level system administrator may control all the mobile device or computer users in a school. At a next level of hierarchy, Hierarchy Level 2, a county-level system administrator may control all the mobile devices or computers in a county: for example, COUNTY A user group may comprise school user groups SCHOOL A, B and C. At a next level higher of hierarchy, Hierarchy Level 1, a state-level system administrator may control all the mobile device users in a state: for example, STATE user group may comprise COUNTY A and B user groups, which in turn comprise SCHOOL A, B and C, and SCHOOL D, E, and F user groups respectively. In the case of an active shooter situation in a particular school, a school-level system administrator for the affected school may utilize the system administrator web portal as previously described to authorize all mobile device or computer users in classroom user groups assigned to that school access to email, or enable use of voice calls or text messaging on the mobile devices or computers, that would allow mobile device users (in this exemplary case, students) to communicate with others such as parents or law enforcement. This is but one example of the use of a plurality of system administrators controlling mobile device access at various hierarchy levels to effectuate efficient, granulized control of a large number of mobile devices. In this manner any number of user groups may be organized in any hierarchy or other relationship as may be logical to support specific goals for controlling or limiting the functionality of mobile devices or computers for large groups.

"Hierarchy" as used herein includes within its meaning any logical organization of mobile devices or computers 102 into a plurality of user groups, wherein the alteration of the system configuration, or the listing of authorized web sites, of the mobile devices or computers 102 in the presence of a disabling signal 1202 are controllable on a user group basis. I.e. the mobile devices or computers 102 within a user group may experience similar limitation of functionality or restriction of web site access to authorized web sites in the presence of a disabling signal, whereas the mobile devices or computers 102 in differing user groups may experience a different limitation of functionality or restriction of web site access to authorized web sites in the presence of a disabling signal. The limitation of functionality or restriction of web site access to authorized web sites of the mobile devices or computers 102 within a user group may be determined by a system administrator using an application running on a system administrator computer such as 1501 in communication with the mobile devices or computers 102 in that user group via a communication network 1601, 1600, and for example 1511.

In an embodiment, there may be a plurality of administrators establishing differing limitations on mobile device functionality inside of, or outside of, specific geographic boundaries, or at differing times. It is not necessary that the specific geographic boundary(s) established by individual administrators or by the transmitters of the invention be mutually exclusive. In other words, a first geographic boundary may overlap or include a second geographic boundary, and so on. The administrators may be characterized as a having a specific level of authority on a hierarchical basis. As a first non-limiting example, a student may be a user of a mobile device for which a parent-administrator, with highest authority, has set a worldwide limitation on functionality. A teacher-administrator may also have set, for the same mobile device, a more restrictive limitation on functionality over a geographic area covering the teacher's classroom (i.e., the geographic boundary encloses the classroom); or, alternatively, a transmitter sending a disabling signal or beacon may transmit the disabling signal within the geographic boundary of the classroom. In this example, when the mobile device is within the geographic boundary of the classroom, the more restrictive limitations on functionality established by the teacher-administrator apply to the mobile device. When the mobile device leaves the classroom and is outside the geographic classroom boundary, the less (or more) restrictive limitations on functionality established by the parent apply to the mobile device.

As a second example, consider an employer for whom a work facility has work areas and rest (or "break") areas. The employer may establish geographic boundaries for work areas in which a first set of limitations on functionality apply, and may establish other geographic boundaries in which a second set of limitations on functionality apply. In this example, a mobile device may be more severely restricted in a work area than a rest area. In embodiments, any geographic boundary may take a higher or lower priority to an overlapping geographic boundary. There is no limit to the number of administrators, or to the number of levels of authority of administrators, or the number of levels of priority of geofenced areas, or to the number of geofenced areas that apply to a specific mobile device. More than one administrator may be characterized as having a specific level of authority (i.e. administrators may share authority levels). And so on. As can be understood by the disclosure of this paragraph, there are any number of permutations of this embodiment of the invention.

Although the figures of the drawings illustrate example embodiments of a disabling device and mobile device, respectively, which may perform the functions of the system and method of the embodiments of the invention, the disabling device and the mobile device as depicted in the figures are each merely an example of devices that may utilize embodiments of the invention.

Embodiments of the invention may be implemented in software, firmware, programmable logic such field programmable gate arrays, hardware, application logic or a combination of software, hardware, and application logic. The software application logic and/or hardware may reside on the apparatus, a separate device, or a plurality of separate devices. If desired, part of the software application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media. In the context of this document, a "computer-readable medium or media" may be any tangible media or means that can contain, or store the instructions for use by or in connection with an instruction execution system, apparatus, or device, such as a computer, with two examples of a computer described and depicted in FIGS. 1 and 6. A computer readable medium may comprise a computer-readable storage medium that may be any tangible media or means that can contain or store the instructions for use by or in connection with an instruction execution system, apparatus, or device, such as a computer. Any software or application described herein may comprise computer executable instructions for carrying out the steps described herein, and such instructions shall be non-transitory in nature and reside in computer readable media.

The geographic area or volume 1200 may be shaped such that functionality of mobile device 102 is restricted in virtually any desired area or volume. For example, the Device Owner Application of the invention may be installed on mobile devices of employees of a certain workplace or on the mobile devices of students of a school to avoid distracting features of the mobile device such as texting, internet, or photography. The disabling signal may be transmitted by an existing or previously installed signal generator as described above; however, the mechanism triggering the disabling signal may be, for example, an physical on/off switch or a software timer that turned the disabling signal on and off at certain times of the day, rather than motion status of the vehicle. The app may query a list, or whitelist, of media access control (MAC) addresses to determine if a received disabling signal is coming from a valid source as described previously. In embodiments, alerts such as the removal of the primary app or secondary app may be communicated to a monitoring party (such as the workplace owner) device as described previously.

The system and method of the invention provide specific advantages over the solutions of the prior art (such as, for example, confiscating phones at certain times and in certain areas, such as when class is in session in a classroom). Such non-limiting examples include:

- students may carry their phones and other mobile devices on them, so there's no need to collect them, avoiding any liability relative to students' personal property;
- teachers may control which apps and websites students have access to and when, allowing beneficial use of mobile devices;
- phones and other mobile devices will still work for voice calls for safety and emergencies;
- in an emergency lockdown situation, the system of the invention may be disabled, allowing full communication from a plurality of students enabling them to report what they see as well as be evacuated by zone if needed (current emergency protocol);
- parents may be System Administrators, designating what their children can access on the internet, and at a which times;
- preset phone restrictions at night for preferred times, e.g., no phone use from 10 pm to 6 am, no phone use at dinner time; and
- allowing internet search only during specified study time, and select only those websites children need to access, e.g. National Geographic, NASA, Smithsonian.

Figure 13:
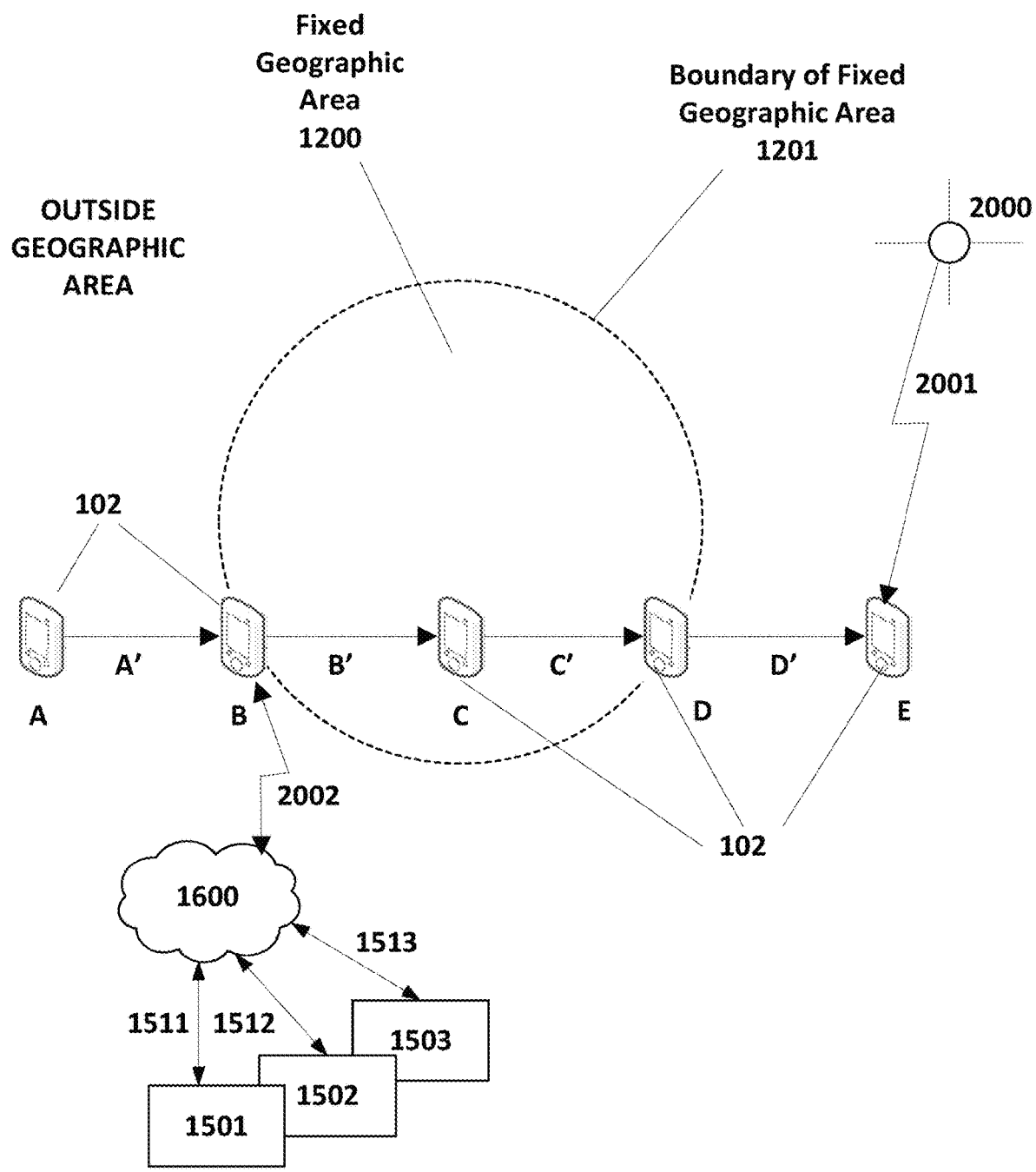
FIG. 13 depicts an exemplary system of a geolocation embodiment embodiment of the invention, in which a mobile device comprises, for example, a GNSS receiver, such as a GPS receiver, for determining the geographic location of a mobile device, the mobile device being in communication with one or more administrator computers via any communication network such as the Internet, and the mobile device also receiving geolocation signals from a GNSS or other geolocation transmitter, which may be but is not necessarily one or more satellites.

Referring now to FIG. 13, in embodiments, the system and method of the invention may be a geofencing system comprising geofencing hardware, software, functions and method steps for the purpose of achieving the goals and advantages of the system of the invention using GNSS technology, i.e. satellite location based technology such as GPS, to determine whether a mobile device is within a fixed geographic area or sub-area, and to take action to restrict mobile device functionality as determined appropriate for that fixed geographic area or sub-area by system administrator who has entered fixed geographic area boundary information and the desired mobile device restrictions for that fixed geographic area into a system administrator computer or web-accessible system administrator application residing on an Internet-connected server, using a web portal accessible by a computer, tablet, mobile device or other electronic device. "Geofencing", as used herein, includes within its meaning the establishment of a virtual fixed geographic boundary surrounding a fixed geographic area, such as, for example 1201, by a system administrator interfacing with one or more system administrator computers such as 1501, 1502, 1503 (or web-accessible system administrator application residing on an Internet-connected server, using a web portal accessible by a computer, tablet, mobile device or other electronic device) and inputting fixed geographic area boundary information into one or more system administrator computers such as 1501, 1502, 1503 (or web-accessible system administrator application residing on an Internet-connected server) for the purpose of defining one or more fixed geographic areas 1200 or sub-areas (the sub-areas not shown in FIG. 13 but depicted in FIG. 15 as sub-areas a through l); receiving mobile device geographic location information from a mobile device, determining whether the mobile device is located within a pre-defined fixed geographic area or sub-area, and transmitting to the mobile device system configuration instructions that are specific to the fixed geographic area or sub-area in which the mobile device is located. Such system configuration instructions for a particular fixed geographic area or sub-area may be variable by time so that, during a first predefined time window, a first set of configuration instructions are associated with said fixed geographic area, during a second predefined time window, a second set of configuration instructions are associated with said fixed geographic area, and so on. In this manner a system administrator may, for a specific fixed geographic area or sub-area, enter into a system administrator computer (or web-accessible system administrator application residing on an Internet-connected server, using a web portal accessible by a computer, tablet, mobile device or other electronic device) information sufficient to define windows of time during a daily cycle, or even varying day-to-day, week-to-week, month-to-month, etc. for which different mobile device restrictions are applicable to mobile devices that are located in that fixed geographic area or sub-area. Thus system configuration instructions for a fixed geographic area or sub-area may be variable by time so that, during a first predefined time window, a first set of configuration instructions are associated with said fixed geographic area or sub-area, during a second predefined time window, a second set of configuration instructions are associated with said fixed geographic area or sub-area, and so on.

Still referring to FIG. 13, in embodiments, when a mobile device or computer 102 is positioned outside the boundary of fixed geographic area 1201 such as in position A, the system configuration of the mobile device may be an unaltered state in which none of the mobile phone functions are restricted; or the mobile device may receive system configuration instructions from a system administrator computer (or web-accessible system administrator application residing on an Internet-connected server, using a web portal accessible by a computer, tablet, mobile device or other electronic device) establishing a universal set of restrictions on mobile device functionality in the form of universal system configuration instructions, in which case the Device Owner Application residing on mobile device 102, in response to the universal system configuration instructions, alters the mobile device configuration to restrict mobile device functionality to the universal set of restrictions. The universal set of restrictions on mobile device functionality may be inputted into from a system administrator computer (or web-accessible system administrator application residing on an Internet-connected server, using a web portal accessible by a computer, tablet, mobile device or other electronic device). For example, a parent may establish a minimum set of universal restrictions that always apply to a child's mobile device, regardless of the geographic location of the mobile device.

Still referring to FIG. 13, as mobile device 102 moves along A' into fixed geographic area 1200, it continues to receive a geolocation signal 2001, which may be a satellite GNSS signal such as a GPS signal from one or more satellites, process the geolocation signal(s) 2001 to determine the current geographic location of mobile device 102, and transmit the current geographic location of mobile device 102 to a system administrator computer such as one or more system administrator computers 1501, 1502 and/or 1503 or from web-accessible system administrator application residing on an Internet-connected server, using a web portal accessible by a computer, tablet, mobile device or other electronic device. A system administrator computer or web-accessible system administrator application residing on an Internet-connected server receives the current geographic location of mobile device 102, determines whether mobile device 102 is within a fixed geographic area such as fixed geographic area 1200, and causes system configuration instructions associated with the fixed geographic boundary within which the mobile device is currently located to the mobile device 102. As depicted in FIG. 13, this occurs when mobile device 102 reaches point B on the boundary 1201 of fixed geographic area 1201. After receiving the system configuration instructions associated with the fixed geographic area 1200, the mobile phone processor or controller executes the Device Owner Application non-transitory computer readable instructions to restrict mobile phone 102 functionality in response to the system configuration instructions received from the system administrator 1501, 1502 or 1503 or from a web-accessible system administrator application residing on an Internet-connected server. This process is repeated each time mobile device 102 crosses a boundary of a fixed geographic area that has been established by a system administrator by entering geographic boundary information into a system administrator computer or web-accessible system administrator application residing on an Internet-connected server, using a web portal accessible by a computer, tablet, mobile device or other electronic device. In the non-limiting exemplary use example of FIG. 13, mobile phone 102 remains subject to the system configuration instructions received from the system administrator 1501, 1502 or 1503 for fixed geographic area 1200 as the mobile phone moves along B' to position C and along C' to position D, where mobile phone 102 again encounters the boundary 1201 of fixed geographic area 1200 as mobile phone 102 moves out of geographic area 1200. As mobile phone 102 moves past point D, it is now outside of fixed geographic area 1200. As mobile phone 102 is still transmitting its current geographic location to at least one system administrator computer, the system administrator computer determines that the mobile phone restrictions associated with fixed geographic area 1200 no longer apply when mobile phone 102 moves out of geographic area 1200, i.e., when it passes point D moving along D' towards point E. Thus a system administrator computer, executing non-transitory computer readable and executable instructions, then causes system configuration instructions associated with the area outside geographic area 1200 to be transmitted to mobile phone 102. The Device Owner Application residing on mobile device 102, in response to the system configuration instructions associated with the area outside geographic area 1200, alters mobile device 102 system configuration to restrict mobile device 102 functionality in accordance with the system configuration instructions, which, in this case, could be a universal set of instructions. In the example of FIG. 13, the mobile device, at point E, is outside any fixed geographic area, so either no restrictions would apply, or the universal set of restrictions would apply.

As used herein, mobile device restrictions may include, but are not limited to: restricting the mobile device's ability to send and receive text messages and email messages; restricting the mobile device's ability to display, access, receive information from, or transmit information to administrator-selected predetermined social media services and/or websites; restricting the mobile device's ability to respond to user input; restricting the mobile device's ability to place and receive phone calls; restricting the mobile device's ability to place and receive phone calls requiring user interaction with a touch screen or a keyboard of the mobile device; restricting the mobile device's ability to utilize a web browser application; restricting the mobile device's web browser from accessing predetermined unauthorized web sites; restricting the mobile device's web browser so that it can only access authorized web sites; restrict the mobile device from accessing video or audio streaming web accessible services; or any other predetermined restriction of mobile device functionality as may be desired; and applying these restrictions during specific administrator-selected time periods in any combination of restrictions, during any duration and combination of time periods.

Still referring to FIG. 13, the system of the invention may comprise one or more system administrator computers 1501, 1502, 1503, and so on, to any number of system administrator computers, each remotely connected to and in communication with mobile device or computer 102 via any communication network 1600, which may be any communication network including but not limited to the Internet, via communication channels 1511, 1512, 1513, and so on, respectively. Mobile device 102 may be in communication with communication network 1600 via communication link 2002 which may be any wireless or wired communication system such a cellular data system, and internet-connected wireless local or broad area network, or any communication network. System administrators may, by inputting data into a web-accessible web portal displayed on a system administrator computer such as 1501, and using a set of non-transitory computer readable and executable instructions running on a processor of a system administrator computer such as 1501, 1502, or 1503 that is in communication with the mobile device or computer 102 through any wireless means such as, for example, a cell-based radio network 1601 connected to the Internet 1600, readily and remotely establish, defined geographic areas and/or sub-areas, which may be but are not necessarily fixed geographic areas. System administrators may also define and enter into the system administrator computer, for each defined geographic area, a defined set of restrictions limiting the use of mobile devices in each area as desired by the system administrator. These defined set mobile device restrictions are for transmitting, in the form of system configuration instructions, to mobile devices that are located within the defined geographic areas such that mobile devices within such defined geographic areas are able to receive the system configuration instructions for the fixed or defined geographic area in which they are currently located, whereby the Device Owner Application residing on the mobile device operates to alter the system configuration for each device in accordance with the system configuration instructions for the geographic area in which the mobile device is located.

Still referring to FIG. 13, mobile device 102 may be in communication with at least one geolocation transmitter transmitting a geolocation signal. The geolocation transmitter may be one or more satellites such as, for example, GPS, GNSS, or any geolocation satellite(s) that transmit geolocation signals that are receivable by mobile device 102. Mobile device 102 comprises receiver for receiving the geolocation signals such that a processor executing non-transitory computer readable and executable instructions is able to, i.e. is "adapted to", determine the current geographic location of mobile device 102. Mobile device 102 is also in communication with one or administrator computers such as administrator computers 1501, 1502, and 1503 1503 (or a web-accessible system administrator application residing on an Internet-connected server, using a web portal accessible by a computer, tablet, mobile device or other electronic device) via any communication means known 1511, 1512, and 1513, including wireless and wired communication networks such as WiFi, cellular wireless data networks, ethernet or other wired communication networks, in embodiments via the Internet, such that mobile device, via a transceiver in communication with the mobile device processor, is able to communicate the current geographic location of mobile device 102 to one or more system administrator computers 1501, 1502, and 1503 1503 (or to a web-accessible system administrator application residing on an Internet-connected server, using a web portal accessible by a computer, tablet, mobile device or other electronic device). It should be noted that it is within the scope of the system of the invention that the system may comprise any number of system administrator computers. In the figures, three system administrator computers are depicted but this is for convenience, to demonstrate just one of many embodiments of the system. The system of the invention is not limited to three system administrator computers in number—the number may be as few as one, or as many as the system user deems appropriate.

Still referring to FIG. 13, when the one or more system administrator computers 1501, 1502, or 1503 receive the current geographic location of mobile device 102, the system administrator computer compares the current geographic location of mobile device 102 to the predefined geographic areas that have been previously entered into the system administrator computer. If mobile device 102 is geographically located within a geographic area 1200 having a geographic boundary 1201, the system administrator computer causes system configuration instructions specific to the geographic area in which mobile device 102 is currently located to be transmitted to mobile device 102. Mobile device 102 receives the system configuration instructions for the geographic area in which it is currently located, and the processor of mobile device 102, operating on Device Owner Application computer readable and executable instructions stored on mobile device 102, carries out the system configuration instructions for the geographic area in which it is currently located that it has received from the system administrator computer. The system configuration instructions may cause any restricting or limiting of any function of mobile device 102 as may be desired by a system administrator, including but not limited to:

restricting the mobile device's ability to send text messages in response to the system configuration instructions received from the at least one system administrator computer;

restricting the mobile device's ability to display received text messages in response to said system configuration instructions received from the at least one system administrator computer;

restricting the mobile device's ability to display send email messages in response to said system configuration instructions received from the at least one system administrator computer;

restricting the mobile device's ability to display received email messages in response to the system configuration instructions received from the at least one system administrator computer;

restricting the mobile device's ability to respond to user input in response to the system configuration instructions received from the at least one system administrator computer;

restrict the mobile device's ability to place phone calls in response to the system configuration instructions received from the at least one system administrator computer;

restrict the mobile device's ability to receive phone calls in response to the system configuration instructions received from the at least one system administrator computer restricting the mobile device's ability to place phone calls requiring user interaction with a touch screen or a keyboard of the mobile device in response to the system configuration instructions received from the at least one system administrator computer;

restricting the mobile device's ability to receive phone calls requiring user interaction with a touch screen or a keyboard of the mobile device in response to said system configuration instructions received from said at least one system administrator computer;

restricting the mobile device's ability to utilize a web browser application on the mobile device such that the web browser may access only authorized web sites in response to said system configuration instructions received from said at least one system administrator computer;

restricting the mobile device's ability to utilize a web browser application on the mobile device such that the web browser may not access prohibited web sites in response to said system configuration instructions received from said at least one system administrator computer;

denying access to specific applications on the mobile device such as gaming applications, social media applications, or other applications.

Figure 14:
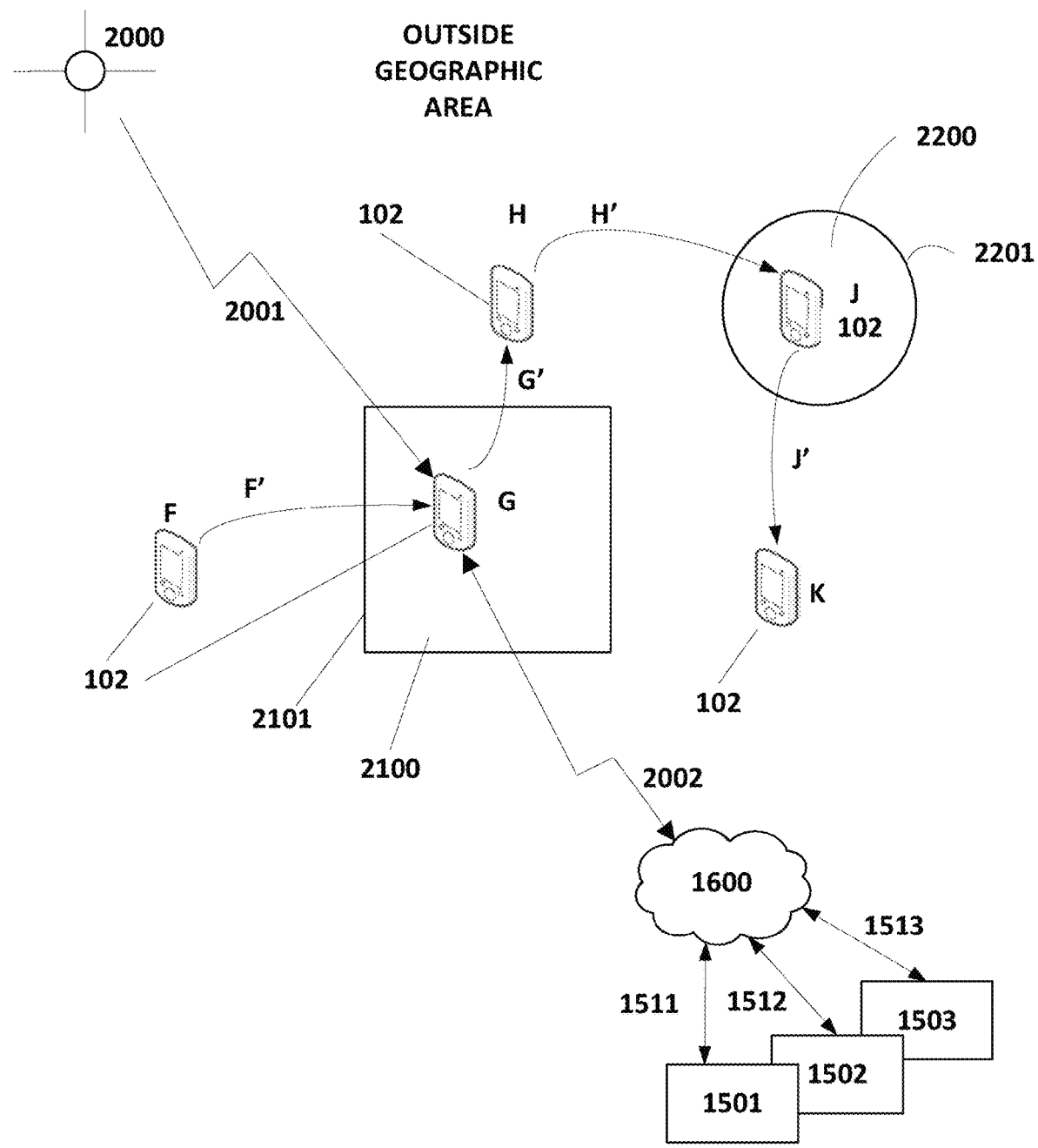
FIG. 14 depicts an example of a geolocation embodiment of the invention in which a user carries their mobile device into a first geographic area A, and then into a different geographic area B for purposes of explaining the geofencing functionality of the system.

Referring now to FIG. 14, a further use case is depicted in which mobile device 102 moves through several defined, fixed geographic areas. At point F, as above described, either no restrictions, or universal restrictions, are transmitted to mobile device 102 by system administrator. In the case in which the mobile device user is a teenager, a parent, acting as a system administrator inputting data into a web-accessible web portal displayed on a system administrator computer such as 1501 (or web-accessible system administrator application residing on an Internet-connected server), may set universal restrictions that are somewhat lax during the day time, restricting only access to certain websites, and more restrictive after 9:00 pm, further restricting the teenager's mobile device such that it is not able to send or receive text messages or access web-accessible streaming services. Thus in this exemplary case the universal restrictions vary by window of time.

Still referring to FIG. 14, mobile device 102 continues to receive geolocation signal 2001 from GNSS satellite(s) 2000, and to transmit mobile device 102's geographic location to the system administrator computer such as 1502 (or web-accessible system administrator application residing on an Internet-connected server), which receives mobile device 102's geographic location and compares to the boundaries of fixed geographic area 2100, which may be, for example a school. A school official, acting as a system administrator inputting data into a web-accessible web portal displayed on a system administrator computer such as 1502, may set restrictions applicable to fixed geographic area 2100 that are somewhat restrictive during school hours, restricting access to most websites except for scholastic websites, preventing texting and phone calls, and preventing video and audio streaming; and less restrictive after school hours, for example setting no restrictions when school is not in session. When the teenager moves along F' and crosses boundary 2101 of geographic area 2100 during school hours, for example as would be the case in which the teenager enters school in the morning, system administrator computer 1502 (or web-accessible system administrator application residing on an Internet-connected server, using a web portal accessible by a computer, tablet, mobile device or other electronic device), which is receiving the teenager's mobile device 102 geographic location and comparing it to the boundaries of fixed geographic area 2100 (the school geographic area), recognizes that the teenager has entered the school geographic area 2100, system administrator computer 1502 (or web-accessible system administrator application residing on an Internet-connected server) causes system configuration instructions associated with fixed geographic area 2100 (the school geographic area) to be transmitted to the teenager's mobile device 102. The Device Owner Application residing on the teenager's mobile device 102 alters the teenager's mobile device configuration in response to the received system configuration instructions associated with fixed geographic area 2100 (the school geographic area) as input by the school official in the system administrator computer or portal. Thus the teenager, while they are within fixed geographic area 2100 (the school geographic area), will be unable to utilize their mobile device for gaining access to most websites except for scholastic websites, text or make phone calls, or access video or audio streaming.

Still referring to FIG. 14, as the day progresses, mobile device 102 continues to receive geolocation signal 2001 from GNSS satellite(s) 2000, and to transmit mobile device 102's geographic location to the system administrator computer such as 1503, which receives mobile device 102's geographic location and compares to the boundaries of fixed geographic area 2200, which may be, for example a conservatory for practicing music. A conservatory official, acting as a system administrator inputting data into a web-accessible web portal displayed on a system administrator computer such as 1503, may set restrictions applicable to fixed geographic area 2200 that are very restrictive during conservatory hours, restricting all use of mobile devices within the fixed geographic area 2200 (the conservatory geographic boundary). When the teenager moves along G and H' and crosses boundary 2201 of geographic area 2200 during conservatory hours, for example as would be the case in which the teenager leaves school in the afternoon and travels to the conservatory, system administrator computer 1503, which is receiving the teenager's mobile device 102 geographic location and comparing it to the boundaries of fixed geographic area 2200 (the conservatory geographic area), recognizes that the teenager has entered the school geographic area 2100 as the teenager crosses boundary 2201, system administrator computer 1503 causes system configuration instructions associated with fixed geographic area 2200 (the conservatory geographic area) to be transmitted to the teenager's mobile device 102. The Device Owner Application residing on the teenager's mobile device 102 then alters the teenager's mobile device configuration in response to the received system configuration instructions associated with fixed geographic area 2200 (the conservatory geographic area) as input by the conservatory official in the system administrator computer or web-accessible portal. Thus the teenager, while they are within fixed geographic area 2200 (the conservatory geographic area), will be unable to utilize their mobile device.

Figure 15:
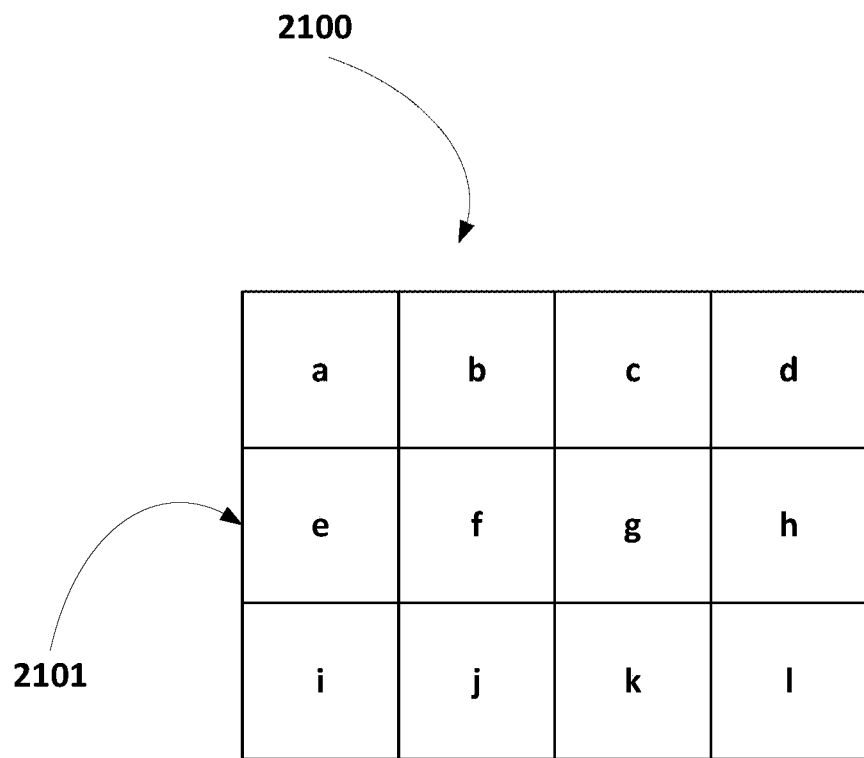
FIG. 15 depicts an example of a geolocation embodiment of the invention in which a user carries their mobile device into a geographic area have predefined sub-geographic areas, which each sub-geographic area may be controlled by an administrator setting specific use rules for each sub-geographic area. The use rules for each sub-geographic area may be independently determined by the administrator for that sub-geographic area.

Referring now to FIG. 15, in embodiments, system administrators may, by inputting data into a web-accessible web portal displayed on a system administrator computer such as 1501, define one or more sub-areas within a fixed geographic area and set restrictions applicable to fixed those sub-areas. As an example, if fixed geographic area 2100 is defined as the geographic area of a school for which geographic boundary 2101 applies, sub-areas a-1 may be geographic areas defined by class rooms, lunch room, band room, gymnasium, etc. so that each room within the school may have its own set of mobile device restrictions applicable only to that room, or sub-area. The mobile device restrictions may be set, for example, by the teacher, coach or other school personnel who are responsible for school activities in that room (sub-area). These sub-areas are not limited only to rooms, as they may apply to any geographic division within the overall fixed geographic area 2100. Thus, sub-areas may apply to any geographic area for which it is desired to establish restrictions on mobile device functionality, such as pool areas, athletic field areas, and any other desired area.

The fixed geographic areas or sub-areas may be of any number and shape.

One or a plurality of mobile devices may be controlled by the system and method of the invention at any time.

In any case in which a mobile device's system configuration is altered by the system and method of the invention, the alteration may be by operation of a Device Owner Application.

Figure 16:
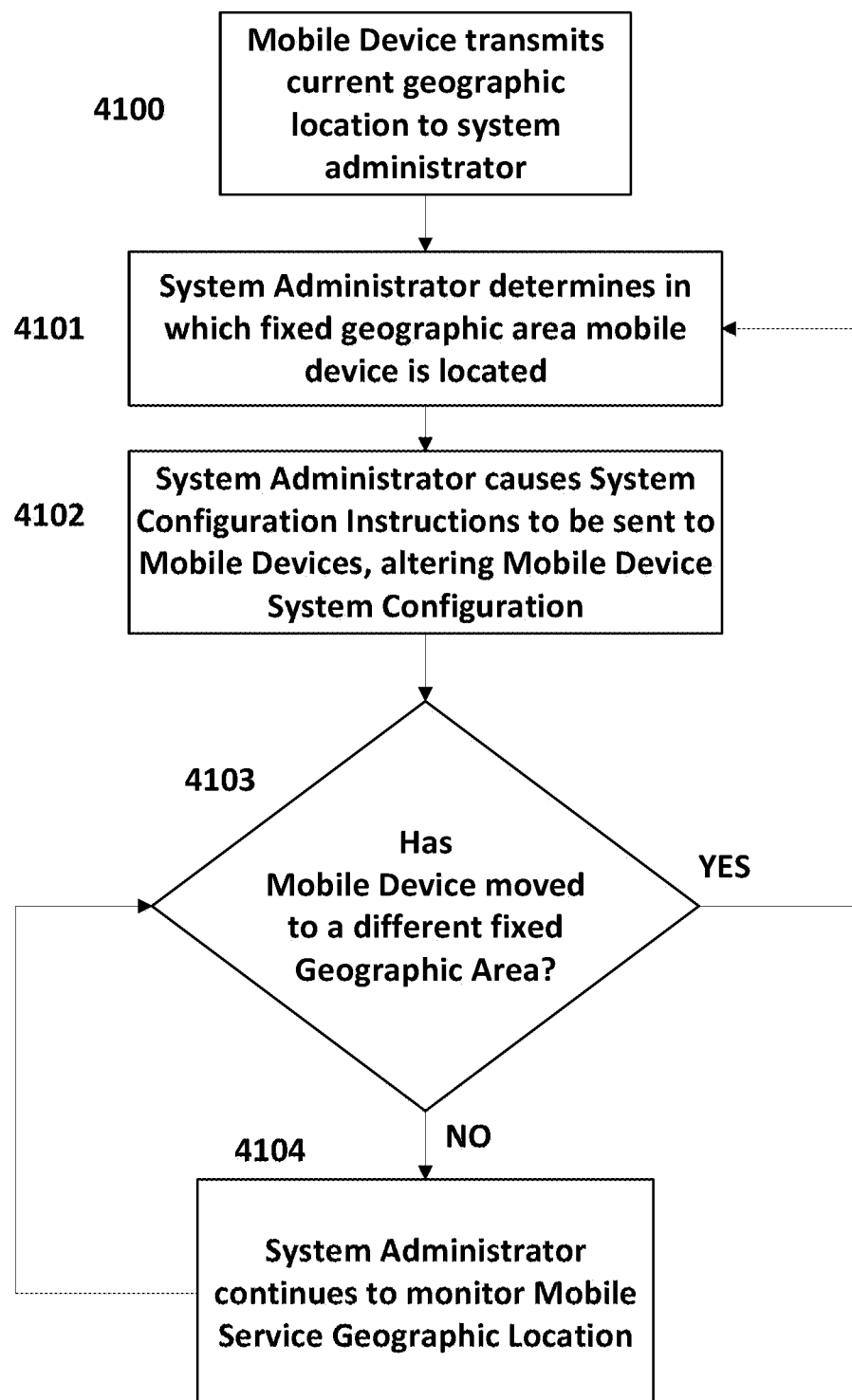
FIG. 16 depicts a flow chart of a geolocation embodiment of the invention.

Referring now to FIG. 16, in embodiments, the system and method of the invention may comprise method steps of:
establishing a fixed geographical area within which it is desired to restrict mobile device functionality by entering the geographical area and boundary information into a system administrator computer or web accessible portal;
establishing a set of desired restrictions for mobile devices that are geographically located in the fixed geographical area by entering the desired restrictions into a system administrator computer or web accessible portal;
receiving, by a mobile device, at least one geolocation signal from at least one geolocation transmitter, which may be one or more GNSS satellites or GPS satellites;
determining, by the mobile device, the geographic location of the mobile device;
transmitting to a system administrator computer or web-accessible server the geographic location of the mobile device (step 4100);
receiving, by the system administrator computer or web-accessible server, the geographic location of the mobile device (step 4100);

comparing, by a system administrator computer or web-accessible server, the geographic location of the mobile device to the geographic boundaries of the fixed geographic area (step 4101);

in the case in which the mobile device is geographically located inside the boundaries of the fixed geographic area, the system administrator computer or web-accessible server causing the transmitting of system configuration instructions to the mobile device, the system configuration instructions containing instructions for altering the system configuration of the mobile device so that the desired restrictions become operative on the mobile device (step 4102);

processing, by a Device Owner Application running on a processor of the mobile device, the system configuration instructions such that the mobile device's system configuration is altered in response to receiving system configuration instructions, restricting the mobile device response to the system configuration instructions as long as the mobile device remains within the boundaries of the fixed geographic area (step 4102); and monitoring, by a system administrator computer or application running on an Internet-connected server, the geographic location of the mobile device to determine whether the mobile device within a fixed geographic area (step 4103); if the mobile device has physically moved to a new geographic area, determine which geographic area (step 4101) and repeat steps 4102 and 4103; if the mobile device has not physically moved to a new geographic area, continue to monitor mobile device location (step 4102).

In any of the embodiments, the system administrator computers may be further defined as one or more servers hosting a set of non-transitory computer readable instructions for carrying out the method steps and functions ("system administrator application") ascribed to the system administrator computer(s) herein. Thus, any reference herein to a system administrator computer or computers includes both computers and a web-portal accessible system administrator application running on one or more Internet-connected servers, the web portal being accessible by a computer, tablet, mobile device or other electronic device, and, generally, from any location where such devices may access the internet via any wired or wireless communication network.

In any of the embodiments of the system and method of the invention requiring communication uniquely with individual mobile devices, such mobile devices may be individually and uniquely registered with the system of the invention by a system administrator inputting into a system administrator computer, or a web-portal accessible system administrator application running on one or more Internet-connected servers, a mobile device identifier, the web portal being accessible by a computer, tablet, mobile device or other electronic device, thus uniquely registering each mobile device with the system of the invention. Messages to a mobile device from a system administrator computer or application may be transmitted uniquely to that mobile device, and messages from that device may be identified as being uniquely from that device by system administrator computer or application, using the unique mobile device identifier for that mobile device.

As regarding computer(s), server(s), mobile device(s), electronic device(s), tablet(s), each of these, as used herein, may comprise one or more controllers or processors in communication with: 1) user input/out devices such as keyboards, monitors, computer mice, touchscreens, microphones, speakers and other input/out devices for receiving input from a user and providing output to a user; 2) transceivers for transmitting and receiving information via known communication and data networks, both wired and wireless, including the Internet, via local and broad area networks; 3) physical media storage devices comprising non-transitory computer readable and executable instructions (software or application code) for execution by the controllers or processors for carrying out the described functions of the invention and carrying out the method steps of the invention. As used herein, when a structure or element is referred to as being "adapted to" perform a certain step or function, "adapted to" includes within its meaning the execution of non-transitory computer readable and executable instructions by a processor, controller, firmware circuit or other electronic structure capable of executing computer readable and executable instructions so as to carry out the method steps and functions disclosed, taught and defined herein.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A system for limiting mobile device or computer functionality in a fixed geographic area in which it is desired to limit or control the use of a mobile device, comprising:
    a mobile device comprising:
        a receiver for receiving a geolocation signal from at least one geolocation transmitter;
        a processor and non-transitory computer readable and executable instructions for determining the mobile device location by processing the geolocation signal from at least one geolocation signal transmitter;
        a transceiver for communicating with at least one system administrator computer; and
        a Device Owner Application, wherein said Device Owner Application is adapted to alter the mobile device's system configuration in response to receiving system configuration instructions from said at least one system administrative computer;
    wherein said mobile device is adapted to receive said geolocation signal from at least one geolocation transmitter, determine the current geographic location of the mobile device, transmit the current geographic location of the mobile device to said at least one system administrator computer associated with said fixed geographic area, and receive system configuration instructions for altering the mobile device's system configuration from said at least one system administrator computer when said current geographic location of the mobile device is within said fixed geographic area.

2. The system of claim 1, wherein said Device Owner Application is adapted to alter said mobile device system configuration so as to restrict the mobile device's ability to send text messages in response to said system configuration instructions received from said at least one system administrator computer.

3. The system of claim 1, said Device Owner Application is adapted to alter said mobile device system configuration so as to restrict the mobile device's ability to display received text messages in response to said system configuration instructions received from said at least one system administrator computer.

4. The system of claim 1, wherein said Device Owner Application is adapted to alter said mobile device system configuration so as to restrict the mobile device's ability to send email messages in response to said system configuration instructions received from said at least one system administrator computer.

5. The system of claim 1, wherein said Device Owner Application is adapted to alter said mobile device system configuration so as to restrict the mobile device's ability to display received email messages in response to said system configuration instructions received from said at least one system administrator computer.

6. The system of claim 1, wherein, said Device Owner Application is adapted to alter said mobile device system configuration so as to restrict the mobile device's ability to respond to user input in response to said system configuration instructions received from said at least one system administrator computer.

7. The system of claim 1, wherein said Device Owner Application is adapted to alter said mobile device system configuration so as to restrict the mobile device's ability to place phone calls in response to said system configuration instructions received from said at least one system administrator computer.

8. The system of claim 1, wherein said Device Owner Application is adapted to alter said mobile device system configuration so as to restrict the mobile device's ability to receive phone calls in response to said system configuration instructions received from said at least one system administrator computer.

9. The system of claim 1, wherein said Device Owner Application is adapted to alter said mobile device system configuration so as to restrict the mobile device's ability to place phone calls requiring user interaction with a touch screen or a keyboard of the mobile device in response to said system configuration instructions received from said at least one system administrator computer.

10. The system of claim 1, wherein said Device Owner Application is adapted to alter said mobile device system configuration so as to restrict the mobile device's ability to receive phone calls requiring user interaction with a touch screen or a keyboard of the mobile device in response to said system configuration instructions received from said at least one system administrator computer.

11. The system of claim 1, wherein said Device Owner Application is adapted to alter said mobile device system configuration so as to restrict the mobile device's ability to utilize a web browser application on the mobile device such that the web browser may access only authorized web sites in response to said system configuration instructions received from said at least one system administrator computer.

12. The system of claim 1, wherein said Device Owner Application is adapted to alter said mobile device system configuration so as to restrict the mobile device's ability to utilize a web browser application on the mobile device such that the web browser may not access prohibited web sites in response to said system configuration instructions received from said at least one system administrator computer.

13. The system of claim 1, wherein the fixed geographic area is further defined as being selected from the group consisting of a work area, a school area, a vehicle traffic area, and a train platform.

14. The system of claim 1, wherein said fixed geographic area is further defined as comprising at least one fixed geographic sub-area.

15. The system of claim 1, wherein said system configuration instructions for said fixed geographic area are variable by time so that, during a first predefined time window, a first set of configuration instructions are associated with said fixed geographic area, during a second predefined time window, a second set of configuration instructions are associated with said fixed geographic area, and so on.

16. A system for limiting mobile device or computer functionality in a fixed geographic area in which it is desired to limit or control the use of a mobile device, comprising:
at least one system administrative computer;
a mobile device comprising:
a receiver for receiving a geolocation signal from at least one geolocation transmitter;
a processor and non-transitory computer readable and executable instructions for determining the mobile device location by processing the geolocation signal from at least one geolocation signal transmitter;
a transceiver for communicating with at least one administrator computer; and
a Device Owner Application, wherein said Device Owner Application is adapted to alter the mobile device's system configuration in response to receiving system configuration instructions from said at least one system administrative computer;
wherein:
said at least one system administrative computer is in communication with said mobile device;
said mobile device is adapted to receive said geolocation signal from at least one geolocation transmitter, determine the current geographic location of the mobile device, transmit the current geographic location of the mobile device to said at least one administrator computer associated with said fixed geographic area, and receive system configuration instructions for altering the mobile device's system configuration from said at least one system administrator computer when said current geographic location of the mobile device is within said fixed geographic area;
said at least one system administrative computer is adapted to receive user instructions for defining said fixed geographic area;
said at least one system administrative computer is further adapted to receive mobile device geographic location information from said mobile device, determine whether said mobile device is within the fixed geographic area or fixed geographic sub-area, and transmit to the mobile device system configuration instructions when said mobile device is located within said fixed geographic area.

17. The system of claim 16, wherein said fixed geographic area is further defined as comprising at least one geographic sub-area, and wherein the fixed geographic area and at least one fixed geographic sub-area are each associated with a system administrative computer that is adapted to receive mobile device geographic location information from said mobile device, determine whether said mobile device is within the fixed geographic area or fixed geographic sub-area, and transmit to the mobile device system configuration instructions when said mobile device is located within said fixed geographic area or fixed geographic sub-area, said system configuration instructions comprising specific system configuration instructions associated with the fixed geographic area or fixed geographic sub-area in which the mobile device is geographically located.

18. The system of claim 16, wherein said Device Owner Application is adapted to alter said mobile device system configuration so as to restrict the mobile device's ability to send text messages in response to said system configuration instructions received from said at least one system administrator computer.

19. The system of claim 16, said Device Owner Application is adapted to alter said mobile device system configuration so as to restrict the mobile device's ability to display received text messages in response to said system configuration instructions received from said at least one administrator computer.

20. The system of claim 16, wherein said Device Owner Application is adapted to alter said mobile device system configuration so as to restrict the mobile device's ability to display send email messages in response to said system configuration instructions received from said at least one system administrator computer.

21. The system of claim 16, wherein said Device Owner Application is adapted to alter said mobile device system configuration so as to restrict the mobile device's ability to display received email messages in response to said system configuration instructions received from said at least one system administrator computer.

22. The system of claim 16, wherein, said Device Owner Application is adapted to alter said mobile device system configuration so as to restrict the mobile device's ability to respond to user input in response to said system configuration instructions received from said at least one system administrator computer.

23. The system of claim 16, wherein said Device Owner Application is adapted to alter said mobile device system configuration so as to restrict the mobile device's ability to place phone calls in response to said system configuration instructions received from said at least one system administrator computer.

24. The system of claim 16, wherein said Device Owner Application is adapted to alter said mobile device system configuration so as to restrict the mobile device's ability to receive phone calls in response to said system configuration instructions received from said at least one system administrator computer.

25. The system of claim 16, wherein said Device Owner Application is adapted to alter said mobile device system configuration so as to restrict the mobile device's ability to place phone calls requiring user interaction with a touch screen or a keyboard of the mobile device in response to said system configuration instructions received from said at least one system administrator computer.

26. The system of claim 16, wherein said Device Owner Application is adapted to alter said mobile device system configuration so as to restrict the mobile device's ability to receive phone calls requiring user interaction with a touch screen or a keyboard of the mobile device in response to said system configuration instructions received from said at least one system administrator computer.

27. The system of claim 16, wherein said Device Owner Application is adapted to alter said mobile device system configuration so as to restrict the mobile device's ability to utilize a web browser application on the mobile device such that the web browser may access only authorized web sites in response to said system configuration instructions received from said at least one system administrator computer.

28. The system of claim 16, wherein said Device Owner Application is adapted to alter said mobile device system configuration so as to restrict the mobile device's ability to utilize a web browser application on the mobile device such that the web browser may not access prohibited web sites in response to said system configuration instructions received from said at least one system administrator computer.

29. The system of claim 16, wherein the fixed geographic area is further defined as being selected from the group consisting of a work area, a school area, a vehicle traffic area, and a train platform.

30. The system of claim 16, wherein said system configuration instructions for said fixed geographic area are variable by time so that, during a first predefined time window, a first set of configuration instructions are associated with said fixed geographic area, during a second predefined time window, a second set of configuration instructions are associated with said fixed geographic area, and so on.

* * * * *